US012652216B2

(12) United States Patent
Williams et al.

(10) Patent No.: US 12,652,216 B2
(45) Date of Patent: Jun. 9, 2026

(54) MONITORING AN INDUSTRIAL FACILTY EMPLOYING INDUSTRIAL INTERNET OF THINGS (IIOT) SENSORS USING A TACTICAL COMPUTE APPLICATION

(71) Applicant: Schlumberger Technology Corporation, Sugar Land, TX (US)

(72) Inventors: Michael John Williams, Cambridge (GB); Derek Long, Cambridge (GB); Peter Gregory, Willingham (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 41 days.

(21) Appl. No.: 18/904,125

(22) Filed: Oct. 2, 2024

(65) Prior Publication Data

US 2025/0112819 A1      Apr. 3, 2025

Related U.S. Application Data

(60) Provisional application No. 63/587,194, filed on Oct. 2, 2023.

(51) Int. Cl.
| | |
|---|---|
| *H04L 41/069* | (2022.01) |
| *H04L 41/14* | (2022.01) |

(Continued)

(52) U.S. Cl.
CPC .......... *H04L 41/069* (2013.01); *H04L 41/142* (2013.01); *H04L 41/145* (2013.01); *H04L 41/16* (2013.01); *H04L 67/12* (2013.01)

(58) Field of Classification Search
CPC ... H04L 41/069; H04L 41/142; H04L 41/145; H04L 41/16; H04L 67/12
See application file for complete search history.

(56) References Cited

U.S. PATENT DOCUMENTS

| | | | |
|---|---|---|---|
| 3,069,654 A | 12/1962 | Hough | |
| 2006/0259271 A1* | 11/2006 | House | G05B 23/0248 |
| | | | 702/181 |

(Continued)

OTHER PUBLICATIONS

"Best-first search", Wikipedia, Retrieved from the internet: https://en.wikipedia.org/wiki/Best-first_search, Retrieved date: Aug. 19, 2025, 2 Pages.

(Continued)

*Primary Examiner* — Viet D Vu
(74) *Attorney, Agent, or Firm* — Jeffrey D. Frantz

(57) ABSTRACT
Systems and methods are provided for monitoring operations of an industrial facility. A gateway device is located at the industrial facility and operably coupled to sensors disposed at the industrial facility. The gateway device executes tasks configured to i) monitor alarms or triggers or other events related to operating conditions of the industrial facility, ii) identify a particular alarm or trigger or other event that is activated or set, iii) identify at least one risk associated with the particular alarm or trigger or other event that is activated or set, and iv) dynamically construct a causal network to evaluate the at least one risk. The tasks can be implemented by a behavior tree (BT) that combines automated causal network generation and risk analysis. The BT performs real-time analysis of the sensor data to generate actions or indicators from the sensor data for input to the casual network for risk analysis.

24 Claims, 13 Drawing Sheets

(51) Int. Cl.

| | |
|---|---|
| *H04L 41/142* | (2022.01) |
| *H04L 41/16* | (2022.01) |
| *H04L 67/12* | (2022.01) |

(56) References Cited

U.S. PATENT DOCUMENTS

| | | | | |
|---|---|---|---|---|
| 2011/0178948 | A1* | 7/2011 | Cheng | G06N 7/01 |
| | | | | 705/348 |
| 2019/0244148 | A1 | 8/2019 | Scott | |
| 2021/0081814 | A1* | 3/2021 | Sidorkin | G06N 5/04 |
| 2022/0058497 | A1* | 2/2022 | Vazquez-Canteli | G05B 15/02 |
| 2023/0067083 | A1 | 3/2023 | Schuck | |
| 2023/0208869 | A1 | 6/2023 | Bisht | |

OTHER PUBLICATIONS

"Semantic Web Stack", Wikipedia, Retrieved from the internet: https://en.wikipedia.org/wiki/Semantic_Web_Stack, Retrieved date: Aug. 19, 2025, 2 Pages.

"Stanford Research Institute Problem Solver", Wikipedia, Retrieved from the internet: https://en.wikipedia.org/wiki/Stanford_Research_Institute_Problem_Solver, Retrieved date: Aug. 19, 2025, 4 Pages.

"Bradford, I. et al., ""Application of Coalescence Microseismic Mapping to Hydraulic Fracture Monitoring Conducted Using a Surface Array"", 75th EAGE Conference Exhibition incorporating SPE EUROPEC, Jun. 10, 2013, 5 Pages, London, UK.".

Colledanchise, M. et al. "Behavior Trees in Robotics and AI. An Introduction",Retrieved from the internet: https://www.taylorfrancis.com/books/mono/10.1201/9780429489105/behavior-trees-robotics-ai-michele-colledanchise-petter-%CB%BBgren, Jul. 20, 2018, 45 Pages.

Das, M. et al., "Semantic Bayesian Network", Enhanced Bayesian Network Models for Spatial Time Series Prediction, Springer, Nov. 8, 2019, pp. 81-99.

Janghorbani, S. et al, "Domain Authoring Assistant for Intelligent Virtual Agents", arXiv:1904.03266v1, Apr. 5, 2019, 9 Pages.

Xu, L. et al.,"A new curve detection method: Randomized Hough Transform (RHT)", Pattern Recognition Letters, May 1990, pp. 331-338, 11, North-Holland.

Clinciu, M. et al., "Explainable Bayesian Networks via Natural Language Explanations and Interactive Visualization", Caltech Explainable AI Virtual Workshop, 2021, 1 page.

Dasari, V. R. et al., "Complexity and mission computability of adaptive computing systems", The Journal of Defense Modeling and Simulation, 2022, 19(1), 7 pages.

Hegland, A. M. et al., "Federating Tactical Edge Networks: Ways to Improve Connectivity, Security, and Network Efficiency in Tactical Heterogeneous Networks", IEEE Communications Magazine, 2020, 58(2), pp. 7 pages.

"AI at the Edge: The next frontier of the Internet of Things", downloaded from the internet on May 28, 2025 from [https://iotbusinessnews.com/download/white-papers/AVNET-ai-at-the-edge-whitepaper.pdf], 10 pages.

Ball, A. T., "AI at the tactical edge for search rescue operations", downloaded from the internet on May 28, 2025 from [https://www.microsoft.com/en-us/industry/blog/government/2021/06/22/ai-at-the-tactical-edge-for-search-rescue-operations/], Microsoft, 2021, 5 pages.

Yang, H. et al., "Dispersed Computing for Tactical Edge in Future Wars: Vision, Architecture, and Challenges", Wireless Communications and Mobile Computing, Article 8899186, 2021, 31 pages.

Kjaerulff, U. B. et al., "Modeling Techniques", Chapter 7 in Bayesian Networks and Influence Diagrams: a Guide to Construction and Analysis, Chapter 7, Springer, 2012, pp. 191-236.

Tucci, R. R., "Introduction to Judea Pearls Do-Calculus," arXiv:1305.5506v1 [cs.AI] Apr. 26, 2013, 16 pages.

* cited by examiner

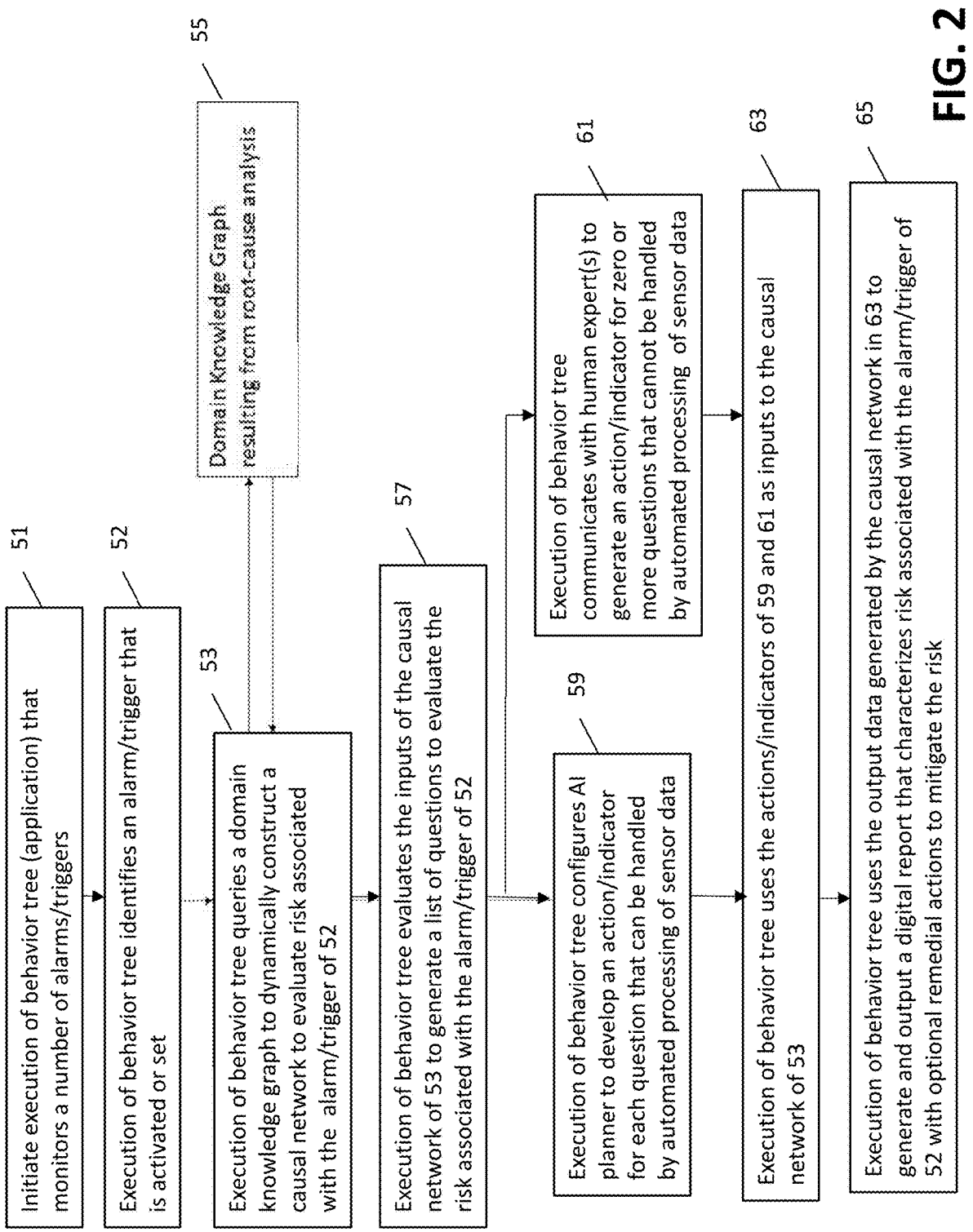

Initiate execution of behavior tree (application) that monitors a number of alarms/triggers — 51

Execution of behavior tree identifies an alarm/trigger that is activated or set — 52

Execution of behavior tree queries a domain knowledge graph to dynamically construct a causal network to evaluate risk associated with the alarm/trigger of 52 — 53

Domain Knowledge Graph resulting from root-cause analysis — 55

Execution of behavior tree evaluates the inputs of the causal network of 53 to generate a list of questions to evaluate the risk associated with the alarm/trigger of 52 — 57

Execution of behavior tree configures AI planner to develop an action/indicator for each question that can be handled by automated processing of sensor data — 59

Execution of behavior tree communicates with human expert(s) to generate an action/indicator for zero or more questions that cannot be handled by automated processing of sensor data — 61

Execution of behavior tree uses the actions/indicators of 59 and 61 as inputs to the causal network of 53 — 63

Execution of behavior tree uses the output data generated by the causal network in 63 to generate and output a digital report that characterizes risk associated with the alarm/trigger of 52 with optional remedial actions to mitigate the risk — 65

FIG. 2

Automated_action

Answers = [ q1, q2, ..., qn]
Cpu_time
Memory
Value_of_information = []

800

900

Rule 1: False

Rule2 : $P(y|do(x), do(z), w) = P(y|do(x), z, w)$ because $(Y \perp Z | X, W)_{G_{\overline{X},\underline{Z}}}$ Rule 3: False

| P1 | P2 | P3 | ... | Pn | | |
|---|---|---|---|---|---|---|
| | | | | | Priority | Inputs polled at 10:30:01 |
| Yes | None | None | ... | Yes | | Yes |
| No | None | None | ... | Yes | | Yes (Superseded) |
| None | None | None | ... | None | | Infer |
| None | Many | None | ... | Some | | Some (Conflict) |
| None | On | Off | ... | None | | Off (Dubious) |
| No | None | None | ... | None | | No (Stale) |
| 60 | 600 | 15 | ... | 3600 | Expiry length | |
| 10:27:15 | 10:23:00 | 10:28:00 | ... | 10:30:00 | Datestamp | |

FIG. 10

| Input | V1 | V2 | ... | Vn | |
|---|---|---|---|---|---|
| {1.0,0.0} | {0.99,0.01} | {1.0,0.0} | ... | {1.0,0.0} | Results posted at 10:30:01 |
| {1.0,0.0} | {1.0,0.0} | {0.99,0.01} | ... | {1.0,0.0} | Expiry : 900 seconds |
| None | None | None | ... | None | |
| {0.0,1.0,0.0} | {0.0,1.0,0.0} | {0.0,1.0,0.0} | ... | {0.0,1.0,0.0} | |
| {0.0,1.0} | {0.0,1.0} | {0.0,1.0} | ... | {0.0,1.0} | |
| {0.0,1.0} | {0.0,1.0} | {0.0,1.0} | ... | {0.01,0.99} | |

FIG. 11

MONITORING AN INDUSTRIAL FACILTY EMPLOYING INDUSTRIAL INTERNET OF THINGS (IIOT) SENSORS USING A TACTICAL COMPUTE APPLICATION

CROSS-REFERENCE TO RELATED APPLICATION(S)

The present disclosure claims priority from U.S. Provisional Appl. No. 63/587,194, filed on Oct. 2, 2023, herein incorporated by reference in its entirety.

FIELD

The present disclosure relates to operational surveillance/ monitoring of industrial facilities employing Industrial Internet of Things (IIoT) sensors and/or connected devices.

BACKGROUND

Current efforts to employ artificial intelligence and/or machine learning to automated systems that monitor the operation of industrial facilities employing IIoT sensors and/or connected devices, such as oil and gas facilities (e.g., wellsites), often generate large numbers of event indicators, alerts, or alarms of low or little relevance, which can overwhelm personnel that are assigned to review the event indicators, alerts or alarms and analyze and remedy any problems related thereto.

Thus, there is a need in the art for improved automated systems that monitor the operation of industrial facilities employing IIoT sensors and/or connected devices in a manner that can prioritize which event indicators, alerts, or alarms are communicated to the relevant personnel assigned to review the event indicators, alerts or alarms and analyze and remedy any problems related thereto.

Furthermore, the computing resources of the automated systems that monitor the operation of industrial facilities employing IIOT sensors and/or connected devices is often limited, which typically constrains the number of sensors that can be used to monitor the industrial facility.

Thus, there is a need in the art for improved automated systems that monitor the operation of industrial facilities employing IIOT sensors and/or connected devices with scarce computational resources together with a higher capacity of sensors that instrument the facility.

SUMMARY

Systems and methods are provided for monitoring operations of an industrial facility. A gateway device is located at the industrial facility and operably coupled to sensors disposed at the industrial facility. The gateway device executes tasks configured to i) monitor alarms or triggers or other events related to operating conditions of the industrial facility, ii) identify a particular alarm or trigger or other event that is activated or set, iii) identify at least one risk associated with the particular alarm or trigger or other event that is activated or set, and iv) dynamically construct a causal network to evaluate the at least one risk. The tasks can be implemented by a behavior tree (BT) that combines automated causal network generation and risk analysis. The BT performs real-time analysis of the sensor data to generate actions or indicators from the sensor data for input to the causal network for risk analysis.

In embodiments, the tasks executed by the gateway device can be further configured to v) evaluate the causal network and generate a list of questions to evaluate the at least one risk.

In embodiments, the tasks executed by the gateway device can be further configured to vi) generate or receive a list of actions or indicators corresponding to the questions that can be computed by scarce computational resources of the gateway device based on automated analysis of sensor data generated from the sensors disposed at the industrial facility, vii) compute the actions or indicators based on automated analysis of sensor data by the scarce computational resources of the gateway device, and viii) use the actions or indicators as input to the causal network to evaluate the at least one risk.

In embodiments, the tasks executed by the gateway device can be further configured to ix) communicate a questionnaire to at least one human expert to obtain additional actions or indicators corresponding to the questions, wherein the additional actions or indicators are provided by the at least one human expert without the gateway device analyzing sensor data generated from the sensors disposed at the industrial facility, and x) use the additional actions or indicators as input to the causal network to evaluate the at least one risk.

In embodiments, the tasks executed by the gateway device can be further configured to build and output a digital report that characterizes the risk based on output data generated by the causal network.

In embodiments, the tasks executed by the gateway device can be implemented by a behavior tree.

In embodiments, the causal network can be a causal Bayesian network or a causal Bayesian network stack.

In embodiments, the construction of the causal network can involve querying and processing a domain-specific knowledge graph. The processing of the domain-specific knowledge graph can be configured to extract a sub-network from a much larger causal network using do-calculus.

In embodiments, the list of actions or indicators can be determined by an AI planner module that balances value of information that each action or indicator brings to a specific question, and the compute cost and/or time it takes to process each action or indicator.

In embodiments, the AI planner module can be configured to create a plan that identifies the list of actions or indicators that are be calculated and input to the causal network for evaluating the at least one risk.

In embodiments, a cloud-computing system or other computing resource can be disposed remotely from the industrial facility and operably coupled to the gateway device. The cloud computing environment or other computing resource can be configured to implement some or all of the functionality of the AI planner module.

In embodiments, the industrial facility can be an oil and gas facility (such as a wellsite).

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The subject disclosure is further described in the detailed description which follows, in reference to the noted plurality of drawings by way of non-limiting examples of the subject disclosure, in which like reference numerals represent similar parts throughout the several views of the drawings, and wherein:

FIG. 2 illustrates a behavior tree for operational surveillance of an industrial facility employing IIOT sensors and/or connected devices in accordance with the present disclosure.

FIG. 10 is a representation of a prioritization of inputs for a Bayesian Network Stack, according to some embodiments of the present disclosure.

FIG. 11 is a representation of an example set of perturbations to inputs for a Bayesian Network Stack, according to some embodiments of the present disclosure.

DETAILED DESCRIPTION

Figure 1:
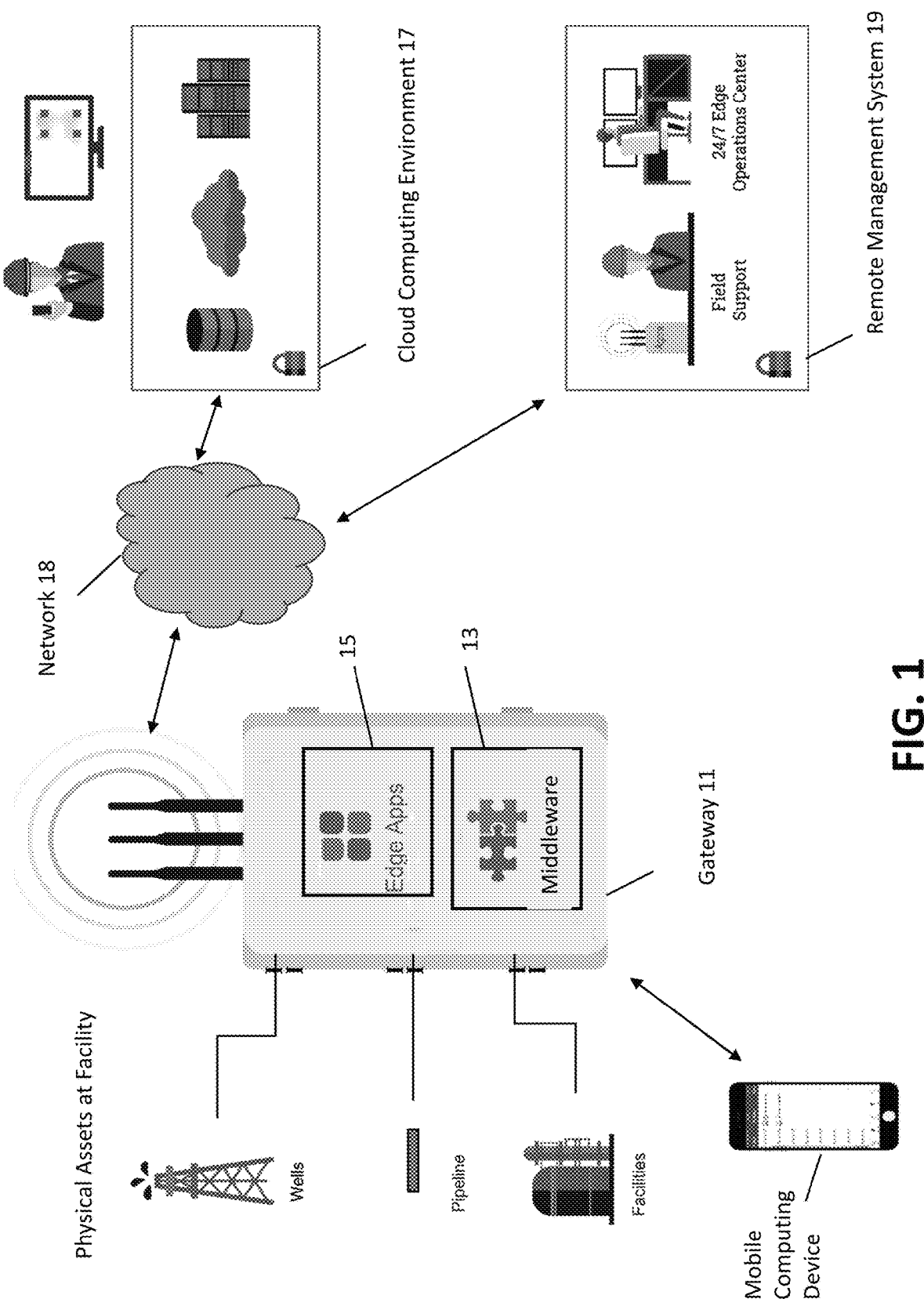
FIG. 1 is a schematic diagram of a distributed computing platform for operational surveillance of an industrial facility.

The particulars shown herein are by way of example and for purposes of illustrative discussion of the embodiments of the subject disclosure only and are presented in the course of providing what is believed to be the most useful and readily understood description of the principles and conceptual aspects of the subject disclosure. In this regard, no attempt is made to show structural details in more detail than is necessary for the fundamental understanding of the subject disclosure, the description taken with the drawings making apparent to those skilled in the art how the several forms of the subject disclosure may be embodied in practice. Furthermore, like reference numbers and designations in the various drawings indicate like elements.

The present disclosure provides systems and methods that employ a distributed computing platform for operational surveillance of an industrial facility employing IIoT sensors and/or connected devices. The distributed computing platform can be configured to perform operational surveillance of the industrial facility using a behavior tree (BT) that is configured to monitor alerts or alarms or events related to operating conditions of the industrial facility. The BT can be configured to combine automated generation and execution of a causal network to analyze sensor data and evaluate risk associated with an alert or alarm or other event.

A BT tree is logically represented as a directed tree of connected nodes that perform a coordinated loop of control operations. The outgoing node of a connected pair is referred to as a parent, and the incoming node of the connected pair is referred to as a child. Child-less nodes are referred to as leaf nodes, and the parent-less node is referred to as a Root node. Each node in the BT, with the exception of the Root node, is one of six possible types: four non-leaf Control-flow node types (referred to as Selector, Sequence, Parallel and Decorator) and two leaf Execution node types (referred to as Action and Condition). A Root node periodically, with frequency $f_{tick}$, generates an enabling signal called tick, which is propagated through the branches of the BT according to the operations defined for each node. When the tick reaches a leaf Execution node type (Action or Condition node), it executes one cycle of the operations specified by the leaf Execution node type (Action or Condition node). The execution of an Action node can alter the system configuration, returning one of three possible state values: Success, Failure, or Running. The execution of a Condition node cannot alter the system configuration, returning one of two possible state values: Success, or Failure. The returned state is then propagated through the BT, possibly triggering other leaf nodes with their own return states, until finally one of these states reaches the Root node. The nodes which are not ticked are set to a special node state: NotTicked. The BT waits before sending the new tick to maintain $f_{tick}$ constant.

A causal network is a computation model that represents the causal relationships between variables. In a causal network, each variable is represented by a node, and the causal relationships between the variables are represented by directed edges between the nodes. The direction of the edges indicates the direction of causality, with the source node causing the effect on the target node. In the context of present disclosure, the nodes of the causal network represent risks associated with alarms or alerts or events related to operating conditions of the industrial facility, and the directed edges of the causal network indicates the direction of causality between nodes.

Figure 16:
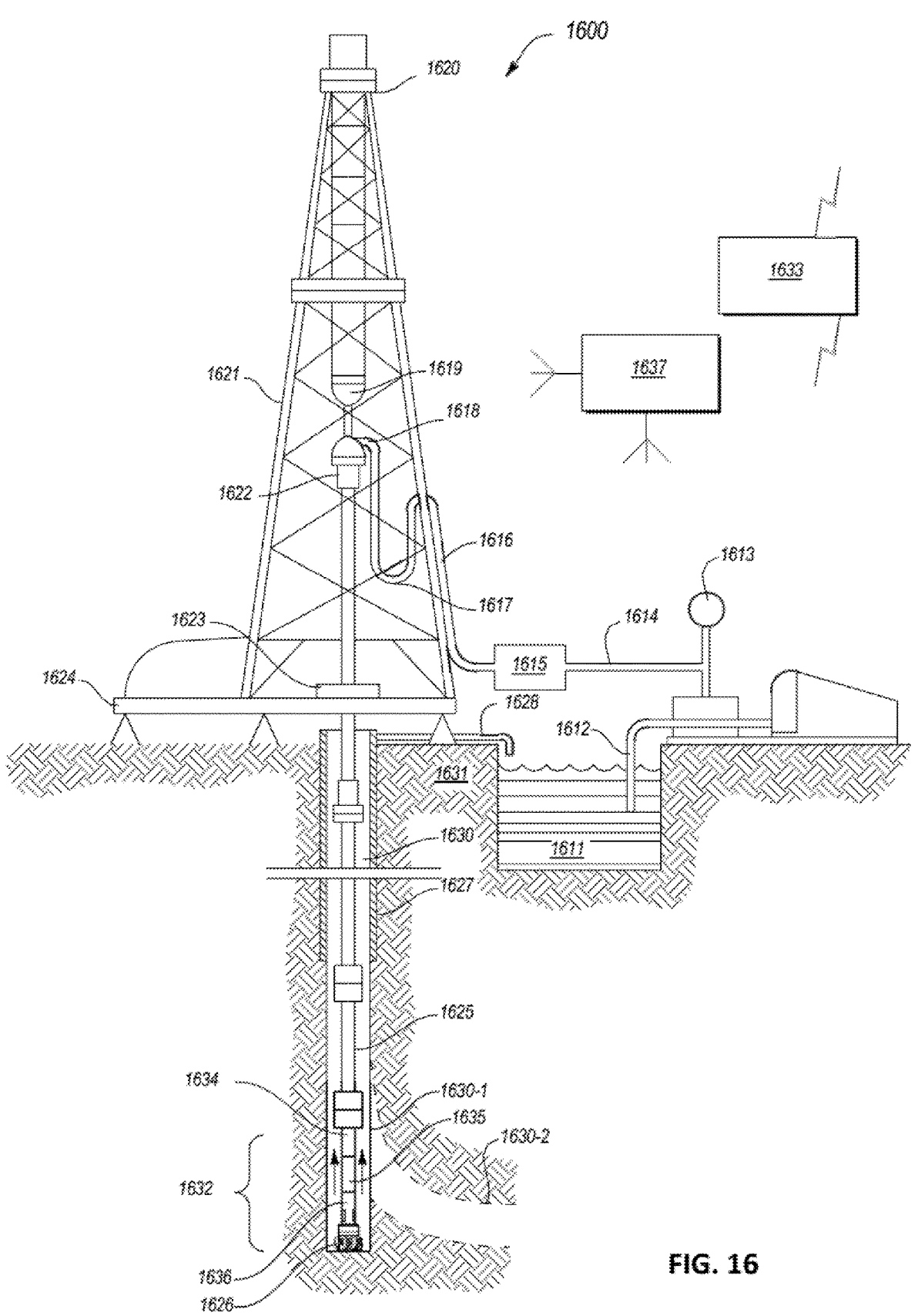
FIG. 16 is a schematic illustration of a downhole drilling system that may be used in connection with some embodiments of the present disclosure.

The distributed computing platform can be configured to interface to a variety of sensor instrumentation used in IIoT (such as oil and gas facilities) and implement various communication protocols to connect to such sensor instrumentation, which allows for monitoring, diagnostics, and automated control of IIoT, such as a wellsite drilling system illustrated in FIG. 16. Sensor data output by such sensors can be collected and processed by a gateway located at an industrial facility in real-time. Data analytics can be used to analyze the sensor data to aid in generating event indicators, alerts or alarms related to events or issues or other operating conditions of the industrial facility.

In embodiments, the distributed computing platform can be embodied by an open, secure, and scalable distributed computing platform. The platform can enable operators to connect physical assets at industrial facilities to the digital world. The industrial facilities are referred to as a "facility" or "facilities" herein. Such physical assets can include equipment or sensor(s) located at oil and gas facilities such as well sites, well pads, pipelines, other field facilities, oil and gas processing and storage facilities, terminals and transport hubs, and other oil and gas facilities.

Data generated by a physical asset at a facility can be collected and processed at the facility and/or in a cloud computing environment to monitor operating conditions and status of the physical asset in real-time, employ data analytics to determine or recommend updates to the operational parameters of the physical asset based on the real-time operating conditions or status, and use the updates to the operational parameters of the physical asset to control the operation of the physical asset. The physical asset(s) at the facility can be controlled remotely from commands issued by the cloud computing environment and/or from commands issued by autonomous control operations performed at the facility. The platform can be configured to utilize advanced digital technologies of Industrial Internet of Things (IIoT), edge computing, cloud computing, data analytics, machine learning and artificial intelligence to improve the operational efficiency of the physical assets, to improve the safety of workforce, and to reduce environmental impact and carbon footprint.

For the sake of description, the architecture of the platform can be divided into five distinct parts as shown in FIG. 1. These five part include i) edge gateway 11 that resides at a facility (e.g., wellsite); ii) middleware 13 executing on the gateway 11; iii) one or more edge applications 15 executing on the gateway 11; iv) a cloud computing environment 17 that is located remotely from the facilities and configured to execute one or more cloud applications that cooperate with the edge application(s) executing on the gateway(s) 11 via data communication therebetween; and v) a remote management system 19 that is located remotely from the facilities and configured to remotely manage one or more gateways 11 via data communication therebetween.

The gateway 11 can be a ruggedized computing device that can be configured to deliver performance edge computing and secure data ingestion. The gateway 11 can be configured to enable real time monitoring and control of the physical asset(s) at a facility (e.g., wellsite). The gateway 11 can be configured with data analytics and/or machine learning and/or artificial intelligence to detect and classify events that reflect operational state of the physical asset(s) at the facility (e.g., wellsite) based on the real-time data generated at the facility (e.g., wellsite). The gateway 11 can also be configured for autonomous control of the physical asset(s) at a facility (e.g., wellsite) based on the events that reflect the operational state of the physical asset(s) at the facility as determined by the data analytics and/or machine learning and/or artificial intelligence.

The gateway 11 can be configured to receive, collect, and aggregate data from a variety of operational equipment (such as sensors, controllers, actuators, programmable logic controllers, remote terminal units, and supervisory control and data acquisition (SCADA) systems), prepare such data for transmission to the cloud computing environment 17, and transmit the data from the gateway 11 to the cloud computing environment 17 over a data communication network 18, such as a cellular data network, satellite link or other mode of available data communication as shown in FIG. 1.

The gateway 11 can be configured to interface to the remote management system 19 over the data communication network 18 as shown in FIG. 1. The remote management system 19, which can be implemented in a cloud computing environment, provides for remote monitoring and control of the gateway 11 as well as remote management of security policies and remote management (such as over-the-air updates) of middleware 13 and/or the edge application(s) 15 that execute on the gateway 11.

The gateway 11 can be housed in a compact and rugged NEMA/IP rated enclosure for outdoor use, making it suitable for the environments at well sites and facilities. The overall packaging can also be environmentally qualified.

In embodiments, the gateway 11 can be configured with a bi-directional communication interface (which is referred to herein as "Southbound Services") to the physical asset(s) at a facility (e.g., wellsite) using either a wired communication protocol (such as a serial, Ethernet, Modbus or Open Platform Communication (OPC) protocol) or a wireless communication protocol (such as IEEE 802.11 Wi-Fi protocol, Highway Addressable Remote Transducer Protocol (HART), LoraWAN, WiFi or Message Queuing Telemetry Transport (MQTT)).

In embodiments, the gateway 11 can be configured with a bi-directional wireless communication interface (which is referred to herein as "Northbound Services") to the cloud computing environment 17 and to the remote management system 19 via the data communication network 18. In embodiments, the Northbound Services can include a cellular modem, which enables long-range data transmission. For example, the cellular modem can provide for 4G LTE data transmission capability (with 3G fallback capability) using suitable communication bands in different regions of the world. For facilities (e.g., wellsites) without a cellular signal, the Northbound Services can include a bidirectional satellite link supplied by an optional external satellite communication modem (such as a BGAN modem). In other embodiments, the Northbound Services can include a wired communication interface (e.g., wired Ethernet link) for communication to the cloud computing environment 17 and to the remote management system 19 via the data communication network 18.

In embodiments, the gateway 11 can employ an embedded processing environment (e.g., data processor and memory system) that hosts and executes the middleware 13 and the edge application(s) 15 as described herein.

In embodiments, the gateway 11 can employ both hardware-based and software-based security measures. The hardware-based security measures can involve a hardware root-of-trust established using an industry standard Trusted Platform Module (TPM) v2.0 cryptographic chip. The TPM v2.0 chip can be installed on the motherboard of the gateway 11. The software-based security measures can include operating system hardening and encryption of both buffered and transmitted data. In embodiments, the TPM v2.0 cryptographic chip can be used for device authentication and storing secrets. This chip contains a strong unforgeable identity in the form of a public-private key pair called the attestation key. This identity can be used to securely identify and connect the gateway 11 to the cloud computing environment 17 and/or to the remote management system 19. The attestation key stored in the TPM v2.0 cryptographic chip can be used to authenticate to the cloud computing environment 17 and to the remote management system 19. The attestation key can be configured during manufacturing and is subsequently used for building trust during device provisioning and connecting to the gateway 11. The TPM v2.0 cryptographic chip can also be used to store cryptographic secrets like keys or certificates on the gateway 11.

In embodiments, middleware 13 can embody an open and extensible software-based operating system which can be operably connected to the cloud computing environment 17 for monitoring and control of the physical asset(s) operably coupled to the gateway 11. The middleware 13 can also be operably coupled to the remote management system 19 for remote management of the gateway 11. The middleware 13 can provide for execution of one or more edge applications 15 on the gateway 11. Such edge application(s) 15 can be developed through an open software development kit.

In embodiments, the middleware 13 can provide open, modular, configurable, and extensible software-based middleware that executes on the gateway 11. In embodiments, the middleware 13 can support a containerized microservice-based architecture. This architecture enables extensibility into several distinct and different solutions for different environments and applications at the edge, while still using the same infrastructure components. In embodiments, the middleware 13 can be configured such that one or more edge applications(s) 15 can be embodied by a container. A container is a standard unit of software that packages up code and all its dependencies (such as runtime environment, system tools, system libraries and settings) so that the edge application runs quickly and reliably in the middleware computing environment. The container isolates software from its environment and ensure that it works uniformly and reliably in the middleware computing environment.

In embodiments, the middleware 13 can include the following service components:

Southbound service component: cooperates with the Southbound Services hardware interface of the gateway 11 to connect to one or more physical asset(s) at a facility (e.g., wellsite); this component can support several protocol services simultaneously to allow for data acquisition and communication with physical assets using different acquisition and communication protocols.

Northbound service component: cooperates with the Northbound Services hardware interface of the gateway 11 to communicate data between the gateway 11 and the cloud computing environment 17 and the remote management system 19 as applicable, and possibly to existing SCADA systems in multiple protocols if necessary.

Infrastructure services component: operates to provide a mechanism for service orchestration, exchange of messages between services and data storage at the edge.

Supporting services component: operates to perform data aggregation, management and reporting and application specific edge-processing services.

In embodiments, the middleware 13 can be based on Microsoft Azure IoT Edge technology. This technology enables development, deployment, and remote management of customized edge applications 15 that are embodied by containerized microservices that execute in conjunction with the middleware services of the middleware 13 on the gateway 11.

In embodiments, the middleware 13 can also be configured to manage security services including TPM-based authentication of the edge application(s) 15 and authorized local access through a local user interface.

In one illustrative embodiment, the gateway 11 can employ an embedded processing environment that includes an Intel Atom E3930 Dual Core Processor operating at 1.86 GHZ, 2 GB of DRAM memory, 8 GB of eMMC memory, a TPM 2.0 security chip (with secure/measured boot support), two Gigabit Ethernet ports for Southbound and Northbound Services, two RS485/422 serial communication ports and one RS232 serial communication ports for Southbound Services, a 4G LTE modem for Northbound Services, a wi-fi radio supporting IEEE 802.11 a/b/g/n wireless modes for Southbound Services, an operating temperature of –40 C to +70 C, a 100-240 v AC power source or 24V DC power source, a power consumption of less than 10 W, a Linux Debian LTS operating system, an enclosure of 10"×8"×4", CE (RED, ROHS), FCC, cULus, WEEE certification and compliance and NEMA4X (IP66) enclosure protection rating. In another illustrative embodiment, the gateway 11 can employ a similar embedded processing environment where the Intel Atom E3930 Dual Core Processor operating at 1.86 GHZ is replaced by Intel Atom E3950 Quad Core Processor operating at 2.0 Hz, the 2 GB of DRAM memory is replaced by 8 GB of DRAM memory, and the 8 GB of eMMC memory is replaced by 32 GB of EMMC memory and 128 GB of SSD memory, which provides a power consumption of less than 20 W.

In embodiments, the gateway 11 can be configured to provide for open edge data aggregation. Specifically, a facility (e.g., wellsite) will typically have equipment, sensors, and control devices from a variety of different original equipment manufacturers (or OEMs), and each OEM brings their own data collection device or gateway. The gateway 11 can be configured to interface to different OEM devices using a wired communication protocol or wireless communication protocol as described herein. In this manner, the gateway 11 can be configured to provide open edge data aggregation for the equipment, sensors, and control devices from a variety of different original equipment manufacturers at a facility (e.g., wellsite), thus displacing the need of multiple OEM gateway devices. Moreover, the gateway 11 can be configured to collect other data types such as video, acoustics, and vibration, which then can be analyzed in the same environment.

In embodiments, the cloud computing environment 17 can embody one or more cloud applications that provide operator users with real-time visualization of data communicated from the gateway 11 (such as events or alarms or sensor data pertaining to one or more physical assets operably coupled to the gateway 11) as well as interpretation and analysis of such data to determine the best strategy for corrective action for the one or more physical assets operably coupled to the gateway 11, if need be. Commands that carry out such corrective action can be communicated from the cloud computing environment 17 to the gateway 11 and relayed (or translated) for communication to the appropriate physical asset(s) operably coupled to the gateway 11. In embodiments, the cloud computing environment 17 can provide on-demand or managed computer system resources, such as data storage (cloud storage) and computing power. The computer system resources can possibly be distributed over multiple geographic locations to minimize latency and provide resiliency in case of network failure.

In embodiments, the platform can be configured in a distributed computing topology in which the information processing occurs both at the facility (e.g., wellsite) (by the edge application(s) 15 executing on the gateway 11) and remotely at the cloud computing environment 17 (by cloud application(s) executing in the cloud processing environment). This feature enables the extension of cloud-based domain-specific workflows and algorithms to the facility (e.g., wellsite).

In traditional approaches, there can be limited real-time processing of high-frequency data produced by the physical assets at a facility (e.g., wellsite). Moreover, the high cost of data transmission can prohibit communicating such high frequency data to a remote cloud computing environment. Therefore, traditional systems communicate limited resolution and limited data to a remote cloud computing environment, thus limiting the insights that could be generated from the high frequency data. In embodiments, the gateway 11 can be configured with data processing capabilities that process high frequency data generated by one or more physical assets at a facility (e.g., wellsite). For example, such data processing capabilities can include data analytics, machine learning and/or artificial intelligence that detect and classify events that reflect operational state of the physical asset(s) at the facility (e.g., wellsite) based on the real-time data generated at the facility (e.g., wellsite). Data representing such events can characterize valuable insights as to the operational state of the physical asset(s) at the facility for surveillance and automation workflows at the facility (e.g., wellsite). Data can be communicated to the cloud computing environment 17 to generate appropriate alarms pertaining to the physical asset(s) at the edge facility (e.g., wellsite) as well as interpretation and analysis of the data in order to determine the best strategy for corrective action for operation of such physical asset(s), if necessary. Commands that carry out such corrective action can be communicated from the cloud computing environment 17 to the gateway 11 and relayed (or translated) for communication to the appropriate facility devices operably coupled to gateway 11. In embodiments, the cloud computing environment 17 can be managed by a cloud service provider, e.g., such as the Azure Cloud of Microsoft.

Moreover, each OEM device at the facility (e.g., wellsite) typically employs different data types and commands. It becomes a challenge to integrate the data types and commands for the collection of OEM devices at a facility (e.g., wellsite) into a single data ecosystem suitable for processing and analysis. The gateway 11 can be configured to solve this problem by bringing data and insights generated at the facility from all OEM devices at the facility into a unified data processing ecosystem. This removes data duplicity and integration challenges. Such data processing ecosystem can be proprietary or open systems selected by operators as suitable or appropriate.

Furthermore, traditional systems were built many decades ago, where the cybersecurity and asset protection were managed through isolation of the operational technology (OT) environment in the field. In embodiments, the gateway 11 can be configured with both hardware-based and software-based security measures that provide controlled access to the gateway 11 for monitoring and remote management of the gateway 11. Most current systems being built today use a traditional approach that require people to travel to the field and manually update the code of controllers or firmware of a sensor or software upgrade of the facility (wellsite) system, therefore limiting the ability to deploy innovative solutions and dynamic intelligence to the facility (wellsite). The gateway 11 can be configured to cooperate with the remote management system 19 to provide an over-the-air update (OTA) feature, which enables remote management of the components at the wellsite, including the physical asset(s), the gateway 11, the middleware 13 executing on the gateway 11, edge application(s) 15 executing on the gateway 11, and the security policies on the gateway 11. In embodiments, the over-the-air update (OTA) feature can provide for such management at scale, for example, including batch mode update of one or more of these edge components.

In embodiments, the cloud computing environment 17 can be configured to operate a data contextualization service component that manages a telemetry channel and a control channel with a respective gateway 11. Such data contextualization service component can also be responsible for establishing communication with, and processing data communication messages to and from the respective gateway 11.

In embodiments, the cloud computing environment 17 can be configured to store data and process data communicated to and from a respective gateway 11. Such stored data can be made available for application and domain specific workflow engines embodied by the cloud computing environment 17.

In embodiments, the cloud computing environment 17 can be configured to provide communication and storage of the physical asset data reliably with high availability and performance through a secure API gateway.

In embodiments, the cloud computing environment 17 can be configured to use HTTPS-based provisioning that allows the middleware 13 of the gateway 11 to securely connect to the cloud computing environment 17. Once the provisioning is successful, MQTT (with TLS enabled) can be used as a communication protocol for the telemetry channel and the control channel with the respective gateway 11.

In embodiments, the cloud computing environment 17 can be configured to implement various microservice components, including functionality or operations of the data processing workflows as described herein.

In embodiments, the cloud computing environment 17 can be embodied by a proprietary or open system selected by operators as suitable or appropriate.

In embodiments, the remote management system 19 can be configured with edge device management services that provide field support for the components of one or more gateways 11 deployed at the facilities (e.g., wellsites). The remote management system 19 can be embodied by a cloud processing environment that provides a management channel that connects to a respective gateway 11.

In embodiments, the remote management system 19 can be configured to provide for remote management of the edge devices deployed at the facilities (e.g., wellsites) over the entire lifecycle of such devices at scale, from site surveying to securely installing the gateway 11 and providing ongoing maintenance in the field. Such edge device management can involve a number of management functions, such as:

onboarding the gateway and/or the devices operably coupled thereto;

decommissioning the gateway and/or the devices operably coupled thereto;

monitoring the status of the gateway and/or the devices operably coupled thereto;

remotely configuring the gateway and/or the devices operably coupled thereto;

remotely updating software/firmware of the gateway and/or the devices operably coupled thereto; and sending non-domain-specific commands (e.g., reboot, shutdown etc.) to the gateway and/or the devices operably coupled thereto.

These functions can involve customized microservices, such as i) secure provisioning of the gateway 11 with minimal human input, or no human input at all, utilizing TPM-based device identity; ii) remote device un-provisioning and credential revocation; iii) device status monitoring, health, connectivity, security, performance; iv) secure and over-the-air updates for the middleware 13 and edge application(s) 15 that execute on the gateway 11; and v) logging and tracking of device interaction for audit and traceability.

In embodiments, the gateway 11 can be configured with a local user interface (UI) to support features such as device configuration, data visualization, etc. The local user interface can be accessed by connecting a mobile computing device to gateway 11 as shown in FIG. 1. For example, the mobile computing device can be operably coupled to the gateway 11 via a Southbound Services interface of the gateway 11 (e.g., Wi-Fi connection or Ethernet connection) as described herein. The mobile computing device can be a laptop computer, tablet, smart phone or other mobile computing device. To protect its privileged function, such local user interface can support user authentication for various deployment scenarios. The configuration of the gateway 11 can eliminate risk due to any unauthorized physical access by not storing any credentials either in plain text or hashed form. User authentication can rely on existing secure IT servers or secure hardware tokens to store the secrets. In a reference implementation where the gateway 11 is connected to the Internet, user authentication can be performed using federation against one or more directories of authorized users. For disconnected scenarios where the gateway 11 is not connected to the Internet, user authentication can be performed using a secure hardware token that contains the user's public-private key.

In embodiments, the middleware 13 can be based on the Debian Linux operating system. The operating system can be hardened to ensure that it will not expose any unnecessary service or port to improve security. To achieve this, unnecessary services and ports are disabled. Furthermore, the gateway 11 can be configured such that it will not run any service for connection from external networks and only makes outbound connections to trusted domains. As such, there are no services that can be connected to exploit. Additionally, certain critical services such as device provisioning, software update, and device management can utilize runtime software that employs mutual authentication for strong security.

The remote management system 19 can be provided by a cloud computing environment (e.g., such as the Azure Cloud of Microsoft) with well-defined administrative controls. The cloud computing environment can be configured to enforce strong authentication for administrator accounts. For example, administrative account passwords can be managed by CyberArk privileged account management (PAM) solution that requires two factor authentications.

The remote management system 19 can be configured to act as a security broker to manage trust between other components of the platform, such as services of the cloud computing environment 17 that have no pre-configured trust with the gateway 11. As described above, the gateway 11 can use a TPM chip that enables the trust relationship with remote management system 19, which can be verified during provisioning. This method requires the public key of each gateway 11 to be pre-configured and stored by the remote management system 19.

In embodiments, the gateway 11 can be configured to implement a BT that processes a sequence of alerts or alarms or other events related to the industrial processes, tasks or operations carried out at the industrial facility. The BT can be configured to combine automated generation and execution of a causal network to analyze sensor data and evaluate risk associated with an alert or alarm or other event.

FIG. 2 illustrates execution of an example BT for operational surveillance of an industrial facility employing IIOT sensors and/or connected devices in accordance with the present disclosure. In embodiments, the BT can be implemented on the gateway 11 of FIG. 1 or some other gateway at an industrial facility with IIoT sensors and/or connected devices.

In 51, the execution of the BT is initiated to monitor a number of alarms or triggers related to the industrial processes, tasks or operations carried out at the industrial facility. Such monitoring can involve cycling through the ordered sequence of alarms or triggers looking for one to be activated or set. Note that an alarm or trigger could be manually activated or set, similar to a fire alarm in a building. Alternatively, an alarm or trigger can be activated or set automatically, for example, by processing continuous sensor data using rule-based or AI/ML detection algorithms.

In 52, the execution of the BT identifies an alarm or trigger that is activated or set.

In 53, the execution of BT queries a domain knowledge graph 55 to dynamically construct a causal network to evaluate risk associated with the alarm/trigger of 52. In embodiments, the query can include one or more identifiers that represent the risk(s) associated with the alarm/trigger of 52. The module 55 is configured to process the query and return a causal network (e.g., causal Bayesian network) which can be used to evaluate the risk(s) associated with the alarm/trigger of 52. Here, the process can allow for the user to have multiple risks of interest, each would be returned as a causal network and stored. Details of this process are described below with respect to FIGS. 6 to 9.

In 57, the execution of BT evaluates the inputs of the causal network of 53 to generate a list of questions to evaluate the risk(s) associated with the alarm/trigger of 52. Each question corresponds to a node in the causal graph for which information may be acquired by the system. For example, a node in the graph corresponding to a pressure measurement may have the question, "Is the pressure lower than, similar to or higher than expected?".

In 59, the execution of BT configures an AI planner module to develop an action/indicator for each question of the list that can be handled by automated processing of sensor data. The industrial facility may have hundreds or thousands of IIoT sensors continually streaming data and may have hundreds to thousands of AI/ML models to process various multiples of those data into actions/indicators for each question of the list. The problem now becomes one of "given I want to assess the risk defined in this specific causal network, how should the scarce computational resources of the gateway be allocated to compute one or more actions or indicators for each question of the list". This requires a balance between the value of information each action or indicator brings to that specific question, and the compute cost and/or time it takes to process each action or indicator. Some alarms or triggers will require a response in a very short time; while other alarms or triggers may allow a more considered evaluation. The AI planner module is configured to generate a list of actions/indicators for each question that can be handled by automated processing of sensor data. Here, the goal of the AI planner module is to satisfy the input information needed by the causal network of 53 given the scarce computational resources of the gateway.

In 61, the execution of the BT communicates with human expert(s) to generate one or more actions or indicators for zero or more questions of the list that cannot be handled by automated processing of sensor data.

In 63, the execution of BT computes the actions or indicators of 59 and uses such actions or indicators together with the human-generated actions or indicators of 61 as inputs to the causal network of 53, which generates output data that represents the risk(s) associated with the active/set alarm or trigger of 52.

In 65, the execution of BT uses the output data generated by the causal network in 63 to generate and output a digital report that characterizes risk associated with the active/set alarm or trigger of 52 with optional remedial actions to mitigate the risk.

Figure 3:
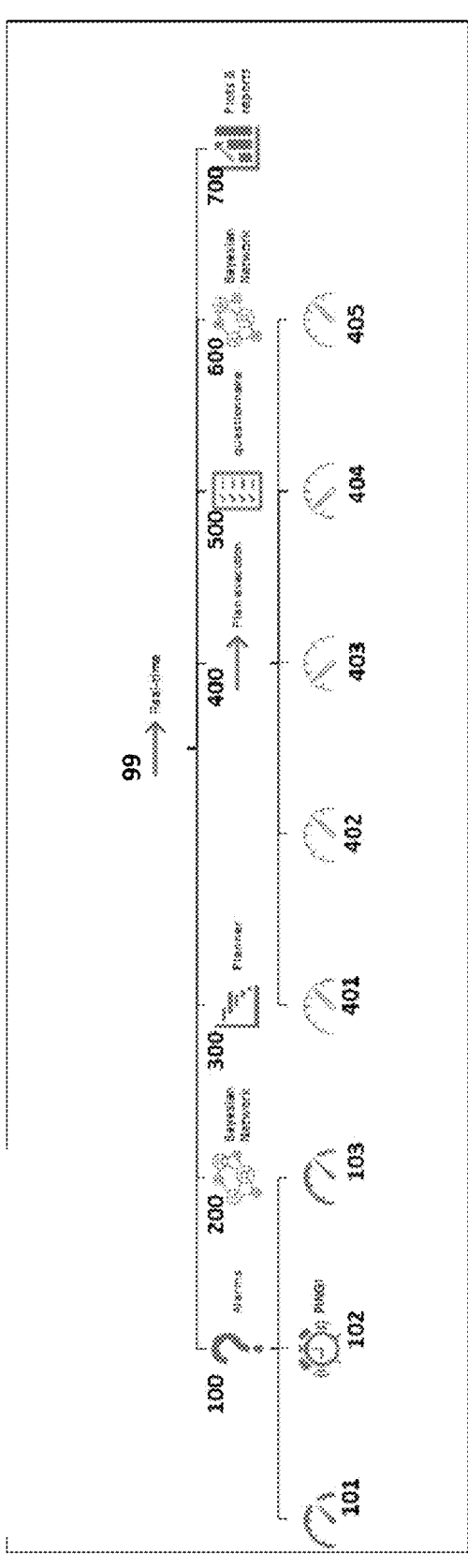
FIG. 3 illustrates a behavior tree for operational surveillance of an industrial facility employing IIoT sensors and/or connected devices in accordance with the present disclosure.

FIG. 3 illustrates execution of an example BT for operational surveillance of an industrial facility employing IIOT sensors and/or connected devices in accordance with the present disclosure. In embodiments, the BT can be implemented on the gateway 11 of FIG. 1 or some other gateway at an industrial facility with IIoT sensors and/or connected devices. The BT of FIG. 3 is configured to process a sequence of alarms or triggers related to the industrial processes, tasks or operations carried out at the industrial facility. The BT implements two primary control loops. The first control loop 99, which is represented by the big right-facing arrow labelled "Real-time", is configured to perform a sequence of tasks in a predefined order until one fails at which point the control loop returns "Failed" up the tree; at the top of the tree, this first control loop 99 will simply re-try processing the sequence of tasks. The second control loop 100, represented by the big question mark?, is the first task of the sequence of tasks of the first control loop 99. The second control loop 100 processes an ordered sequence of alarms or triggers until one is activated or set. When an alarm or trigger is activated or set, the second control loop 100 returns "Success" up the tree and control passes back to the "real-time" node 99 to enable the first control loop to process the second through seventh tasks of the first control loop. When no alarm in the ordered sequence of alarm is activated or set, the second control loop 100 returns "Failed" up the tree and control passes back to the "real-time" node 99 to initiate another iteration of the first control loop 100.

In FIG. 3, the operations of the BT are described from top to bottom, with each layer from left to right. The first control loop 99 (depicted by the big right-facing arrow labelled "Real-time" at the top) processes the ordered sequence of seven tasks. The first control loop 99 first initiates the first task, which performs the second control loop 100 that processes the ordered sequence of alarms or triggers (depicted by the '?' labelled Alarms). The first task/second control loop 100 cycles through the ordered sequence of alarms or triggers looking for one to be activated or set. Note here that an alarm or trigger could be manually activated or set (similar to a fire alarm in a building). Alternatively, an alarm or trigger can be activated or set automatically, for example, by processing continuous sensor data using rule-based or AI/ML detection algorithms. If no alarm or trigger in the ordered sequence of alarms or triggers is activated or set, the first task/second control loop 100 returns "Failed" and the control passes back to the "real-time" node/first control loop 99, which itself will now return "Failed". Since the "real-time" node is the top node, it will begin another iteration of the first control loop 99. The base state when nothing is happening, therefore, is to loop over the sequences of alarms or triggers of the first task 100 until one is activated or set. The order of the alarms or triggers in the ordered sequence of alarms or triggers is relevant such that higher priority alarms or triggers are processed prior to the lower level or advisory only alarms or triggers.

If an alarm or trigger is activated or set, the second control loop/first task 100 passes control back to the "real-time" node (first control loop 99) to process the second through seventh tasks of the first control loop 99. The second task 200 is configured to dynamically construct a causal network that analyzes one or more risks relevant to the alarm or trigger that has been activated or set. The construction of the causal network can involve selecting or generating a causal network from a catalogue of separate causal networks, or extracting a sub-network from a much larger causal network using do-calculus. Do-calculus is an axiomatic system for replacing probability formulas containing the do operator with ordinary conditional probabilities. Do-calculus is described in Robert R. Tucci, "Introduction to Judea Pearl's Do-Calculus," arXiv: 1305.5506v1 [cs.AI] 26 Apr. 2013. The second task 200 is expected to return "Success" after constructing an appropriate causal network, which will be used later as described below. Causal networks are described in Clinciu M., Lau H., & Williams M. (2021). Explainable Bayesian Networks via Natural Language Explanations and Interactive Visualization, Caltech Explainable AI Virtual Workshop.

The evaluates the inputs of the causal network constructed by task 200 to generate a list of questions to evaluate the risk(s) associated with the active/set alarm or trigger. Such evaluation can be similar to the evaluation of 57 of FIG. 2 described above. The third task then configures an AI planner module to generate a list of actions/indicators for each question that can be handled by automated processing of sensor data. The industrial facility may have hundreds or thousands of IIoT sensors continually streaming data and may have hundreds to thousands of AI/ML models to process various multiples of those data into actions/indicators for each question of the list. The problem now becomes one of "given I want to assess the risk defined in this specific causal network, how should the scarce computational resources of the gateway device be allocated to compute one or more actions or indicators for each question of the list". This requires a balance between the value of information each action or indicator brings to that specific question, and the compute cost and/or time it takes to process each action or indicator. Some alarms or triggers will require a response in a very short time; while other alarms or triggers may allow a more considered evaluation. The AI planner module can be configured to identify a list of actions/indicators for each question that can be handled by automated processing of sensor data. Here, the goal of the AI planner module is to satisfy the input information needed by the causal network given the scarce computational resources of the gateway device.

The fourth task 400 computes the actions or indicators for each question that can be handled by automated processing of sensor data. The fourth task can dynamically process the streaming IIoT sensor data to calculate the actions or indicators corresponding to the list of indicators generated by the AI planner module.

In many instances, certain information cannot be observed or evaluated via real-time on-line sensors at the facility. In this case, the fifth task 500 can involve communication with one or more human experts (such as field engineer or other designated person) that collects the required action or indicator from the human expert(s) via answers to questions presented to the human expert(s) in the form of a questionnaire. This is important in the same way that the manually triggered alarm is important. Specifically, the BT automates risk assessment by supporting complete risk assessment via automation without reducing or restricting the risk assessment to information that can be acquired only from automated online sensors. Once the required information is gathered from the answers to questionnaire, the sixth task 600 configures this information together with the indicators or actions generated by the fourth task as input data for the causal network and configures the causal network for processing the input data. The causal network is then executed to process the input data to generate output data that characterizes risk relevant to the alarm or trigger that has been activated or set. The output data can also characterize uncertainty related to the risk.

The seventh task 700 generates a digital report based on the output data of the causal network. The digital report can include relevant descriptions of the risk relevant to the alarm that has been activated or set. Such descriptions can be generated from the cause-effect relationships in the causal network. The digital report can optionally specify actions to mitigate the risk. The digital report can also include off-set well information that is relevant to the decision maker. The digital report can be communicated to and accessed by one or more experts (such as the field engineer, a geologist or lead engineer) to develop operational actions that mitigate the risk described in the digital report.

The BT of FIG. 3 employs a tactical compute aspect by addressing situations where one or more actions or indicators for the analysis cannot be computed with the available compute resources of the gateway device in a short-enough time, or are otherwise not available. In this case, such information can be collected from a questionnaire communicated to a human in the loop (e.g., field engineer). This ensures that the system can always execute within its constraints of the available computing platform (gateway device) at the industrial facility.

In embodiments, the operations of the third task 300 can involve sending information to a cloud computing environment or other computing resource(s) separate from the gateway to implement some or all of the functionality of the AI planner module. For example, the AI-planner module can possibly involve a computationally intensive task (such as a well drilling simulation) that is executed in a cloud computing environment in the event that the gateway device will not have sufficient computing resource(s) to implement some or all of the functionality of the AI planner module.

In embodiments, the operations of the AI-planner module can be configured to generate a list of available indicators that are relevant to the risk being evaluated. Each available indicator can have i) an information content value representing how much it influences the estimate of risk being evaluated and ii) a computational cost value representing the computational resources (e.g., compute time and intensity) required to calculate the indicator. Given that the list of available indicators can be large, and that all of the indicators cannot be calculated, the operations of the AI-planner module can be configured to prioritize and cull the list of available indicators, creating a plan that identifies a set of indicators that are to be calculated and input to the selected causal network for evaluating the alarm and associated risk. This allows the BT to do the best possible job of assessing the risk automatically. Note that the plan generated by the AI planner module can stack multiple indicators that are computed in parallel with one another (at the same time), where the computing resources of the gateway device allow.

In embodiments, the operations of the second task 200 can be configured to dynamically construct a causal network in the following way. First, one or more risks are selected that correspond to the active/set alarm or trigger. For example, the process can identify a "stuck pipe risk" and a number of related sub-risks (e.g., "hole cleanliness risk", "geometry risk", and "differential sticking risk") that corresponds to the selected risk (e.g., "stuck pipe risk"). Second, the identified sub-risks are associated with nodes in a domain-specific knowledge graph. The domain-specific knowledge graph can be very large. In one example, the knowledge graph can contain well engineering knowledge structured in cause-effect chains. Third, starting from the nodes in the knowledge graph that are associated with the identified sub-risks, the process looks upwards and downwards along the connections/arrows in the knowledge graph (i.e. things that cause the risk upwards and things that causes the risk downwards) and assesses the nodes that it visits using do-calculus to determine whether they can be considered as an "intervention". An intervention is a node that allows the process to cut the connections/arrows coming in. In this way, the process constructs the causal network for the risk of interest by cutting or extracting the selected causal network from a much larger and more general knowledge graph (such a knowledge graph related to well construction). This is the key differentiation between causal networks and probability-based approaches like Bayesian Networks. More specifically, in the calculation of the network they are the same, but the adherence to strictly causal graph structures enables this identification of interventions which then allows the right information to be included in the calculation.

Figure 4:
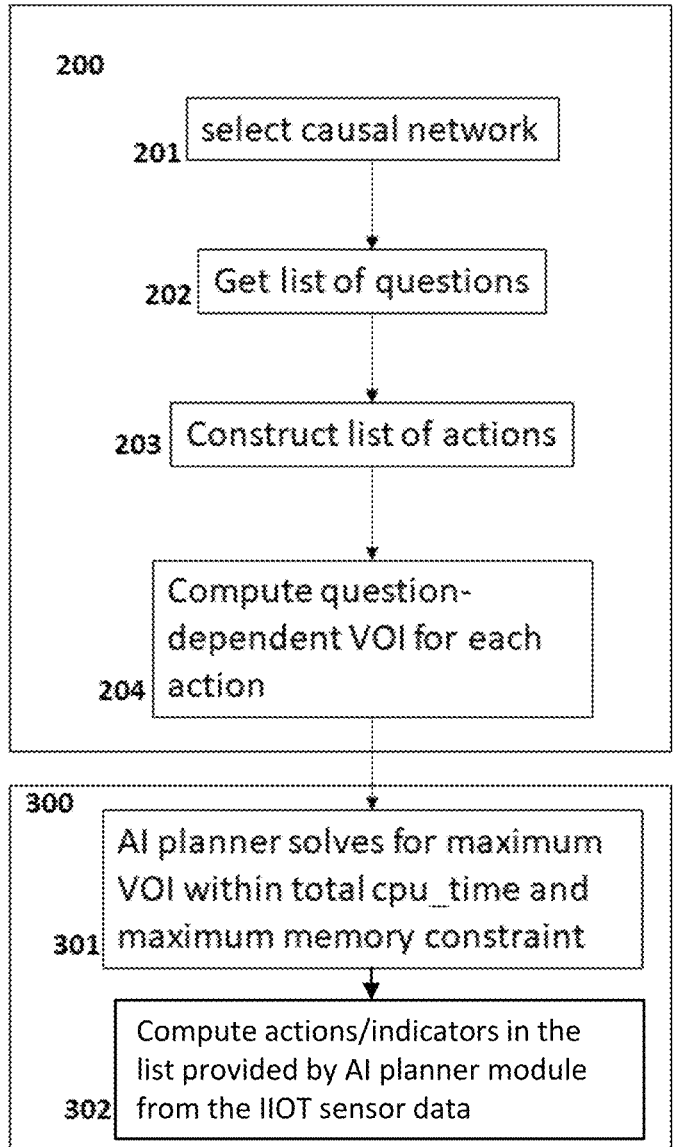
FIG. 4 illustrates tasks of the behavior tree for FIG. 3 for operational surveillance of an industrial facility.
Figure 5:
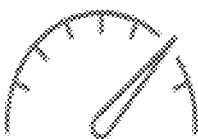
FIG. 5 is a schematic illustration of an automated action, which can be configured to handle a question as part of the workflow of FIG. 4.

As part of the execution of the BT as shown in FIG. 4, the causal network 201 can be analyzed for its inputs 202, which naturally lead to a list of questions that can be answered to better evaluate the risk. For each question in the questionnaire, the process determines whether the question can be handled by an automated action (FIG. 5). When a question can be answered by an available automated_action, an action 203 can be created for the planning process. Note that several questions may be answered by the same automated_action, so the list of actions for the planning problem is a set with no duplicates and the questions that are answered are post-conditions. Each automated_action (FIG. 5) can have a known expected cpu_time and memory use, noting that low memory automated_actions might be computed concurrently 204. The process can maintain a list of the available questions as post-conditions. However, it is preferred that the process answer those questions that have a high cross-entropy of information with the target risk (Value of Information or VOI). This can be computed for each of the questions in our list of post-conditions in a standard way as described in U. B. Kjaerulff and A. L. Madsen, Bayesian Networks and Influence Diagrams: a Guide to Construction and Analysis, Chapter 7, pages 191-236, Springer, 2012. In 301, the AI planning module solves for the maximum total VOI within the available target total cpu_time (which is predefined) and subject to the maximum memory constraints of the gateway device. The generated plan is a list of automated_actions that combine sensors and data-driven indicators. In 302, the BT computes the actions/indicators in the list provided by AI planner module from the IIoT sensor data, which is subsequently used as input to the causal network for risk evaluation. Such actions/indicators can provide answers to a subset of the questions, resulting in determining as-far-as-possible the risk estimation automatically.

Returning to FIG. 3, when the plan is completed (as a result of planning task 300), the now partially filled questionnaire may be presented to the domain experts (e.g., wellsite engineers) in task 500, for example on a display screen, so that the automated responses may be reviewed and additional questions (that could not be answered by automated analysis of sensor data, or were detected as having low VOI in the initial no-information context) can be answered manually. In task 600, the resultant populated causal network is calculated so that the risk is estimated. The output of the causal network is used to build a digital report in task 700, which includes details of the present risk evaluation in context of other historical wells and summarizes explanations of the cause-effect relationships along key paths through the causal network.

FIGS. 6 to 9 illustrate a process that extracts a causal Bayesian network based on one or more risks in accordance with the present disclosure.

The knowledge captured in a causal Bayesian network can include domain knowledge in the form of probabilities. The causal Bayesian network can be the result of many hours of work by multiple experts and results in a detailed description of the domain that goes far beyond the original use.

Causal Bayesian networks can be defined by domain experts via questionnaires presented to the experts in the field via a software system. This can further be extended to incorporate machine-derived question answering, including in real-time. These techniques rely on extensive and detailed work to handcraft the causal Bayesian network, with explicit changes to accommodate insights from local field data. So, there is a challenge to incorporate insights developed at a location by the local field experts. In-country data restrictions (e.g., data residency requirements for subsurface formation data) can make the incorporation of local insights particularly challenging.

In embodiments, the causal Bayesian networks can be defined by a fully automated system where all the questions in the questionnaire are answered from data and artificial intelligence (AI) systems in real-time or near-real time. Between these two extrema are the range of situations involving partial automation. Currently, IIoT systems cannot flexibly adapt to increasing levels of automation.

In embodiments, an execution system is described to support all levels of partial automation and which is flexible and able to adapt as the automation level increases. This is implemented, in some embodiments, by use of an existing collection of Bayesian Networks that are executed in sequence to provide the advice or decision. In this disclosure, this is referenced as a Bayesian Network Stack (BNS) and this collection, defined by an ordered list of the network names, is sufficient to initialize the system.

In some embodiments of the present disclosure, these challenges can be overcome. Such embodiments can capture existing causal Bayesian networks in one or more triplestores, using a small, fit-for-purpose ontology. The existing application(s) are then reconstructed via a SPARQL query rather than being explicitly coded. Local field crews (and clients) can extract and train sub-networks using SPARQL queries and can store results of trained nodes in local triple stores, which means that this location-specific information can be accessed as needed. Since the triple stores are optionally only aggregated by the SPARQL query, there can be an absence of a requirement to pool data into a single datastore, and data residency concerns can be solved by retaining data in the country where it is used.

Further to this, the same or other embodiments of the present disclosure offer an approach to growing a large system of domain knowledge across many causal Bayesian networks by enabling inference of inconsistencies between hand-crafted networks. These checks and balances are difficult to implement in conventional systems. Some embodiments therefore explicitly introduce 'causedBy' as a subclass of 'dependsOn' to differentiate between causation and mere correlation. This means that the present system can also support causal analysis.

Triple stores, RDF, and SPARQL form part of the W3C Semantic Web Stack. SPARQL refers to the SPARQL Protocol and RDF Query Language, which is a semantic query language for databases, and is an RDF query language able to retrieve and manipulate data stored in the Resource Description Framework (RDF) format.

A causal Bayesian network can be defined via PR-OWL, and embodiments of the present disclosure can be provided a simplified operation as MEBN logic is not used in at least some embodiments. Therefore, PR-OWL is not adopted for some implementations, but could be used in others.

Other options to enhance the capabilities of causal Bayesian Networks are to extend the causal Bayesian Networks (e.g., a Semantic Bayesian Network). In addition to, or in lieu of extending the scope of Bayesian Networks, some embodiments may instead employ more conventional networks from SPARQL queries.

Supervised learning on causal Bayesian networks can be used. Additionally, the do-calculus offers a method for analyzing causal graphs and mapping them to probability graphs (i.e., Bayesian Networks). Three rules of do-calculus can be considered, and include: insertion/deletion of observations; exchange of observations and actions; and insertion/deletion of actions, under specific changes to a graph (i.e., removing arrows that connect nodes).

The discussion below describes one embodiment of the present disclosure, consistent with the introduction above.

General Methodology

Figure 6:
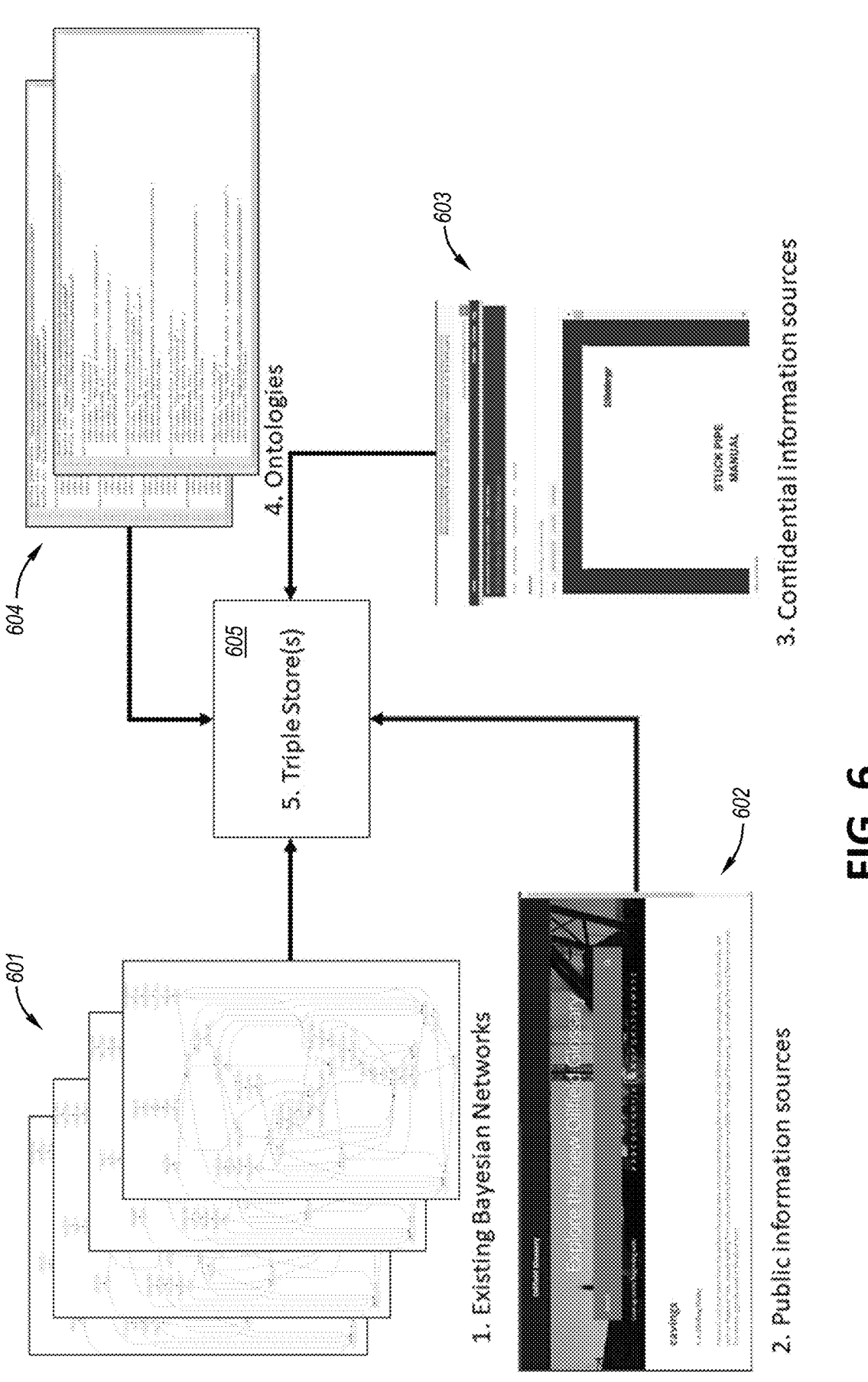
FIG. 6 is a map of a process, according to some embodiments of the present disclosure.

Turning now to FIG. 6, existing and optionally hand-crafted causal Bayesian networks are shown at 601. Such networks can be encoded using an ontology 604 for storage in a triple store 605. Links to public information sources 602 (such as the SLB Energy Glossary of SLB) and proprietary information 603 are associated with the encoded nodes and node relationships, again via the ontologies 604 and these associations are stored in the triple stores 605.

Figure 7:
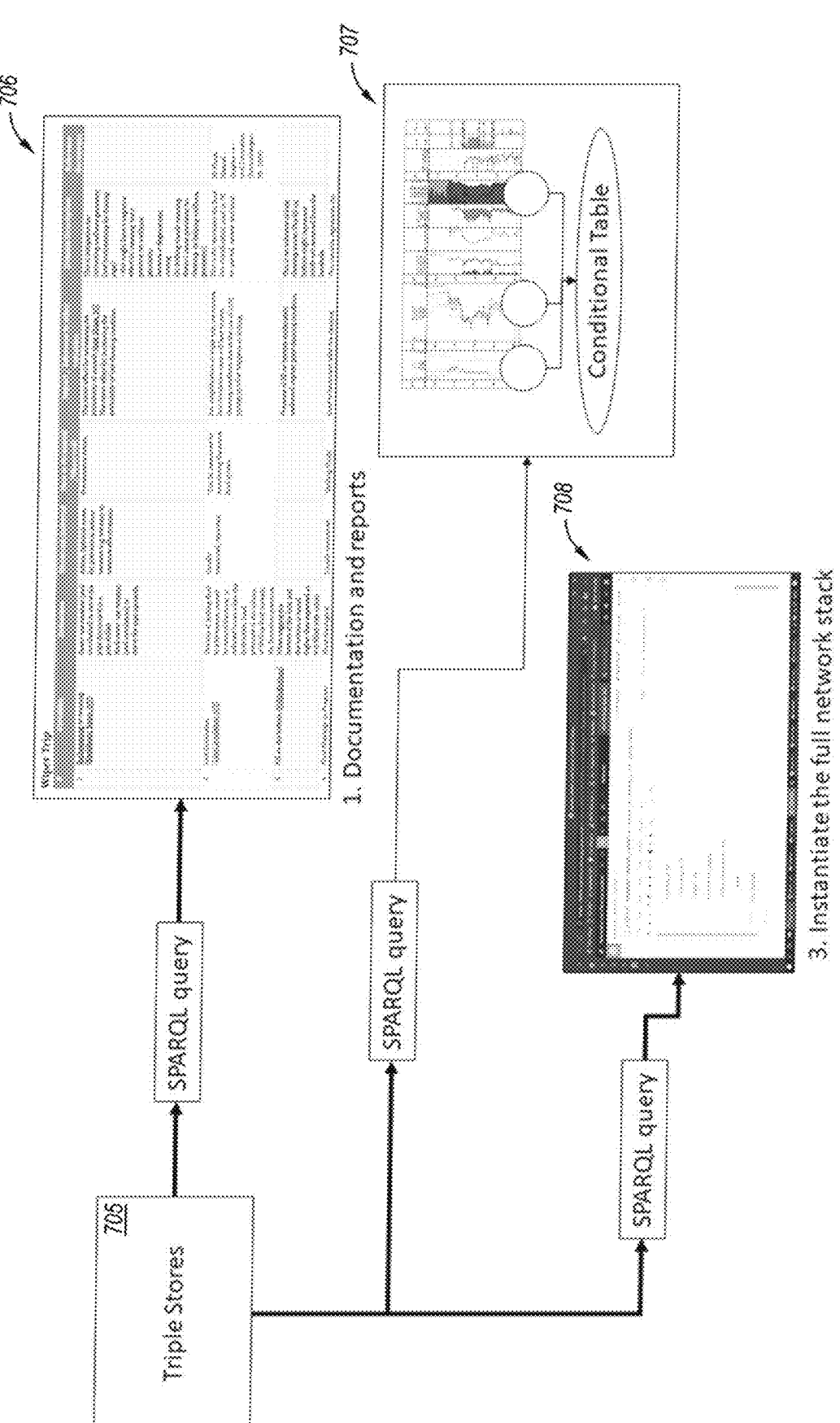
FIG. 7 is a map of a process of using triple stores for multiple uses, according to some embodiments of the present disclosure.

With reference now to FIG. 7, triple stores 705 (which may include triple stores 605 of FIG. 6) can be queried using SPARQL to retrieve aggregated information that is used in automatically generated applications. Three illustrative examples are considered here.

At 706, an example includes use for documentation and reports. This can include providing a user interface that allows the user to click on a node in a causal Bayesian network and be taken to compiled information about the origin of that node (for example, one or more public information sources 602 or confidential/proprietary information source 603 of FIG. 6). This also may include composite dashboards or reports, where information extracted from multiple sources are collated into a single PDF, MS Word, or other formatted document.

At 707, another example includes use for training partial or complete networks on local information. For example, if a set of observations exists for offset wells, a SPARQL query could extract the causal Bayesian network containing conditional probability tables that derive from those observations. Once trained, the information from the sub-network can be stored in a triple store 705 and so become accessible to SPARQL queries. These triple stores 705 can be in-country local or even in clients' own storage (and thereby only accessible to SPARQL or other types of queries with appropriate authentication and access permissions). Using this method, local enhancements to causal Bayesian networks can be made without recourse to the original experts who hand-crafted the initial solution. The sub-network structure can be inferred from the information in the triple store 705, so can be consistent with the network structure in the full application.

At 708, another example includes use for instantiating a causal Bayesian network. The SPARQL query can incorporate superseding information on any given node with information from another source (such as an in-country or in-client triple stores 705, or via links uncovered in those triple stores 705 that lead to conventional or other data-bases). This enables the system to be evergreen as it is created at run-time using the most up-to-date information available; respect is also given to appropriate data and client confidentiality requirements.

Example of Sub-Network Trained to Local Data

Where local data exists and the conditional probability tables relating nodes are not universal, it can be beneficial to take advantage of locally derived tables in the causal Bayesian network. In one embodiment, the following steps may be used, as illustrated in the process map 800 of FIG. 8. Consider the nodes whose probability tables can be directly observed in the local data, such as Obs1 809 and Obs2 810 in FIG. 8. A query can be constructed that extracts the direct dependency graph, identifying the conditional tables that arise from the observations (Conditional1 811 and Conditional2 812).

A further query can be constructed that extracts the immediate parents of those conditional tables 811, 812. In the example in FIG. 8, we see that this has identified an external dependency 813.

Figure 8:
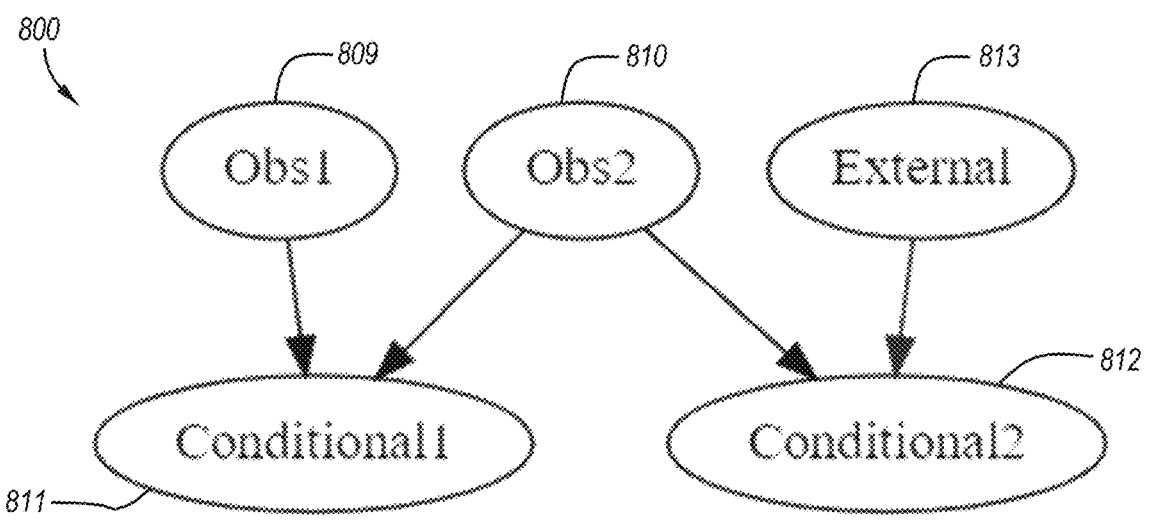
FIG. 8 is a process map, according to some embodiments of the present disclosure.

More complex multi-layer graphs can, of course, be handled in an analogous way to the simple example of FIG. 8. Where there is no external dependency, the conditional table(s) 811, 812 can be trained using the available observations. In some instances of external dependencies 813, it will be possible to consider other sources of information in the training. In the more difficult case where there are external influences whose effect is unknown, embodiments of the present disclosure can be used to recognize these as the set U the causal analysis of Pearl, J. "Causality: models, reasoning and inference, 2009, and can then analyze the graph appropriately (see "Causal analysis" herein). In this way, the system infers appropriate sub-graphs for local training.

Example of a Handcrafted Causal Bayesian Network

To provide for hand-crafted causal Bayesian networks, some embodiments include a link 'memberOf' that ties a node to one or more explicit networks. This allows the creation of inferences for validation as the system grows. For example, if a hand-crafted causal Bayesian network contains overlapping nodes with another hand-crafted causal Bayesian network, it could be the case that each of these networks contain different linkage patterns. Such situations can arise due to slightly different definitions of the meaning of the nodes. It is possible to compare the original network generated from a query excluding the new example, to the same network created using the combined set. This immediately highlights potential issues, which can then be resolved prior to incorporating the new hand-crafted network into the system.

Another example use case is to instantiate a base causal Bayesian network using 'memberOf' links, and then to explore other definitions of those same nodes. For instance, this can be done in in-country triple stores. This then becomes a fit-for-field or fit-for-basin advisor rather than a general case, allowing local knowledge to be incorporated.

Causal Analysis

Figure 9:
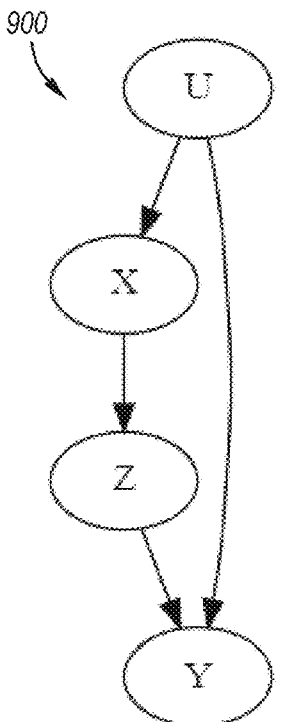
FIG. 9 is a process map with a minimal graph, where one of the three rules of do-calculus is true, according to some embodiments of the present disclosure.
Figure 12:
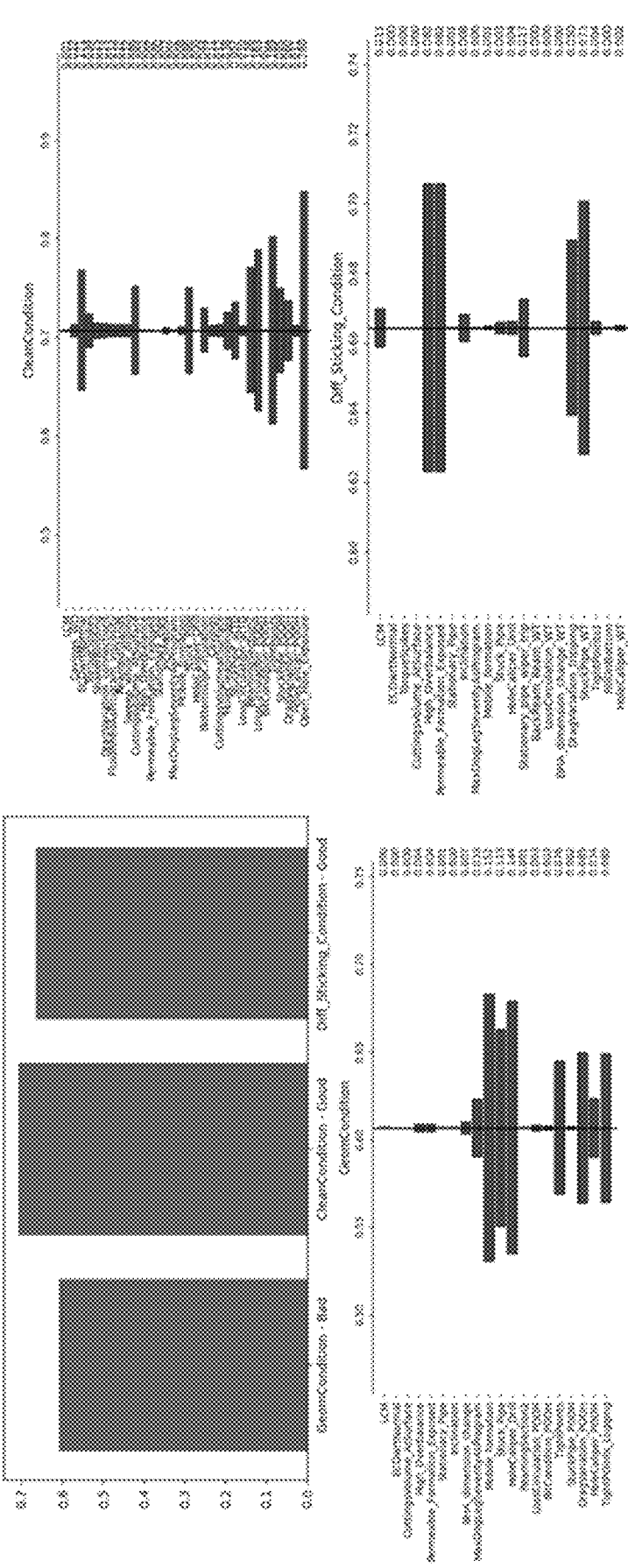
FIG. 12 is a view of a dashboard, according to some embodiments of the present disclosure.

The so-called do-calculus of Pearl, supra, provides a mechanism for exploring causal relationships and defining experiments. In embodiments of the present disclosure, the graphical analysis and subsequent data-driven testing of causal assumptions can be readily derived from the SPARQL queries. The mapping 900 of FIG. 9 shows a minimal graph, where one of the three rules of do-calculus is true.

Combining the extraction of sub-graphs for data-driven study with the do-calculus analysis means that embodiments of the present disclosure can allow the development of causal inference engines. As a particular example, given some observables a graph might be extracted, and that graph may contain extended branches for which observable information is not available. The rules of do-calculus inform situations where observations can be replaced with actions, or can handle unknown externalities thereby constructing a sub-graph that can be validly trained without resulting in inconsistencies with the wider network that may be ignored.

In embodiments, any of a number of different inputs can be used for the causal Bayesian networks of the system. For instance, inputs to the causal Bayesian networks can come from historical, real-time, or human sources. Historical information may include, for instance, past well data, including wellbore plan data, surface sensor data, downhole sensor data, seismic survey data, and the like. Some historical data may, for instance, be available through DRILLOPS, DRILLPLAN, and DELFI platforms available from SLB. Optionally, data may be collected or otherwise processed from one or more historical sources, and can involve multiple wells. For instance, machine learning or AI systems such as those provided by Dataiku SAS may be used to access or process historical data.

Real-time information can be accessed in a number of ways and from any of various sources. For instance, surface sensors on a rig, downhole sensors in a BHA, or other drilling system sensors or data may be used. This information may be used in a raw data form, or may be processed. For instance, surface signals may be used to infer downhole conditions, with the inferred conditions used in real-time or near-real time as a source for the BHS. In some implementations, real-time data may be accessed through a platform such as the AGORA platform that can connect edge devices (e.g., at the rig) with cloud computing to provide access to the data, as well as to provide data analytics and data visualization.

Information from human operators may also be used. For instance, a wellsite supervisor, drilling engineer, or other human that interfaces with a downhole system may log data (e.g., at an edge computing system) and that information can be conveyed to the causal Bayesian networks for use.

Of note, these categories of input sources can be prioritized in any suitable manner. For instance, the historical data may provide priors for the causal Bayesian networks, the real-time processed sensor data may answer a subset of questions, and a human expert such as the rig supervisor may provide up-to-date judgement on aspects that are currently out-of-reach to automated interpretation. In other embodiments, real-time or human data can be prioritized over historical data.

In the context of some embodiments of this disclosure, the term "external system" can be used to describe one or more of sources of input, executors of the causal Bayesian networks, dashboard or other results visualization, or automated execution systems that act on the decisions. In this sense, such embodiments of the present disclosure consider use of "foundational layer systems" that interact with external systems.

Additionally, some embodiments of the present disclosure can include systems and components for populating inputs. For instance, a generic "write inputs package" (WIP) can be used to populate a subset of inputs. The WIP can be received and owned by an external system. Each WIP may further behave asynchronously and populate its own inputs. The inputs can be received by a "blackboard" component that stores the inputs in an "input stack" alongside both the timestamp at which the inputs were received and the number of seconds until the inputs should be considered stale (which can be the "expiry"). Each WIP can include a unique identifier, or "hash", that accompanies the other input information. It is up to the external systems requesting each WIP to define how the inputs are populated, and a system may fulfill multiple WIPs corresponding to sets of Inputs that differ in their priority (in the sequence of importance) and in the length of expiry. Upon creation of a WIP, a corresponding null set of inputs, with the WIP's hash and a zero expiry time can be sent to the blackboard. This means that the input stack can always be fully populated at least with expired nulled inputs corresponding to all WIPs that have been requested. Further, by implementing a hierarchy of systems, culminating in the possibility for a human operator to complete remaining checklist items, difficulties with long or asynchronously processed checklist items can be overcome. Similarly, in lieu of checklists of a fixed nature that may only partially be relevant to a given situation, prioritization can facilitate the generation of checklists for only required information in the then-present context, and only for information that is not otherwise available from other sources (e.g., historical or real-time inputs).

Independently and asynchronous to the generation of inputs from various sources, an "inference engine" (IE) with access to "read input stack" which implies parsing the blackboard's input stack in priority order to construct the inputs to the BNS (see "Prioritization of Inputs" as discussed herein), which includes information on the state of each input. The IE also has access to "write outputs", which corresponds to making inferences about nodes. The outputs are received by the blackboard, which optionally stores them on an "output stack". An example use case is described in the inference section herein. It is possible that the IE execution can be triggered by a WIP (for example a human enters data into a questionnaire and clicks 'OK' or 'submit'), but the system supports fully independent and asynchronous operation (for example, the case where the BNS is re-evaluated every so often (e.g., every 5, 10, 15, 30, or 60 minutes).

Independently and asynchronous to WIPs and IEs, a "dashboard" has access to a "read input stack" or "read output stack". This has several uses for external systems, such as real-time system health alarms (e.g., monitoring when inputs go stale) or providing dashboard views of IE results. See "Non-inference Uses" as discussed herein for an example.

A fourth option, providing read input stack and write inputs is, for example, useful when human expert intervention is needed. See "Supplementary Questionnaire" herein for an example.

In some embodiments, a summary of asynchronous pieces includes the following:

| Inputs | Outputs | Package Name |
|---|---|---|
| Write | | Write Inputs Package |
| Read Stack | Write | Inference Engine |
| Read Stack | Read Stack | Dashboard |
| Read Stack-Write | | Supplementary Questionnaire |

In each case in such embodiments, the write operation is stored in either the input stack or the output stack by the blackboard. The blackboard can therefore operate as a time-keeper by storing the time-stamp upon receiving data, to remove any requirement to time-synchronize all the feeds. This provides asynchronous separation of all the activities of the different packages.

In certain embodiments, a Behavior tree can be configured to manage the real-time execution. This can include sequence nodes for each category. External systems further populate the blackboard asynchronously. The system can interrogate the blackboard and activate re-computation of the inference engine(s). Each set of answers can be given an expiry date stamp, after which it is treated as stale (see the "Use of Stale" data). Behavior trees can also be used to construct compound types (See "Compound Types").

The clock-tick for recomputing the IEs can be separated from the question answering. The use of the stale-date thus supports asynchronous responses and determining the potential risks.

By supporting the separation of the networks into individual question-based systems, it is possible for data-driven responses to replace individual question answers or entire Bayesian Network estimations.

As real-time data-driven responses mature this execution architecture naturally adapts, similarly as new networks are designed and deployed. Changes in external systems or WIPs can be made without any changes or even disruption of the IEs.

Embodiments of the present disclosure thus provide for the asynchronous operation of different sources of information.

FIGS. 10-14 describe a process that dynamically constructs a relevant Bayesian network calculation using a behavior tree (BT) with a real-time prioritization scheme. The discussion below describes one embodiment of the present disclosure, consistent with the introduction above.

Configuration of the Causal Bayesian Networks

A collection of causal Bayesian networks (or Bayesian network stack) can be stored in a database or as a directory of files. The system can maintain a sequenced list of a subset of the available causal Bayesian networks of the Bayesian network stack. Description of the Bayesian network stack can optionally be captured as text files (e.g., in a *.dne format from NETICA, or in a JavaScript Object Notation (JSON) format). The files can be modified to contain information as to which nodes can be populated from external sources through the use of comments. For example, the files can be modified in an XML format for an input in a *.dne file as follows:

```
comment = " <NodeData>\n\
        \|          <QuestionData>\n\
        \|              <Index>8</Index>\n\
        \|              <InputType>slider</InputType>\n\
        \|              <Question>ECD</Question>\n\
        \|                  <BestStateIndex>1</BestStateIndex>\n\
        \|          </QuestionData>\n\
        </NodeData>";
```

The configuration of the Bayesian network stack can be stored as a list. The following shows, for instance, an example setup for a number of causal Bayesian networks stored in an A&P program's sandbox in the DATAIKU platform:

```
directory =
    "/home/dataiku/dss/jupyter-run/dku-workdirs/HOLECONDIT...
    fnames = ['0-Drilling_to_TD','1-Circulating_at_TD',
                '2-Wiper_Trip','3-POOH_and_Logging',
                '4-Open_Hole_Exposure']
```

Write Package Configuration

For the write package configuration, a set of one or more "answer system" objects can make a request and thereafter receive a "write package". The "write package" can contain at least two items. For instance, an example write package may be:

```
{
"hash" : XCVBNS2S,
"ui_nodes" : [ ],
}
```

In this example, the "hash" is optionally used by the blackboard to identify the write package. The hash may therefore operate as a type of identifier, and alternatives could be used, including a public/private key token for authentication. The hash can also be used to define the sequence of priority for the different answer system information sources (see "Prioritization of inputs" herein).

The "ui_nodes" from this example include the nodes that contain question information (e.g., for a checklist/questionnaire). The question information from these nodes can be used to render a checklist or questionnaire for a human user, or used to define appropriate data-driven input from sensors or a historical database of past operations.

When a write package is created, a new set of inputs can be populated on the input-stack, assigning a priority to the hash. This new set of inputs can contain 'None' in every field, be timestamped with the current system date, and have an expiry set to zero seconds. In some cases, 'None' (or a similar term) can be the empty or null object identifier rather than a string token "None". The write package has access to re-write this set of inputs, which is optionally the only access the write package has to the system. For instance, the write package may not have authorization to write the timestamp, which can instead be set when results are submitted with the appropriate "hash".

Using a design such as that of this embodiment can result in the contributing systems being free to populate those parts of the combined network for which they have been provided input information. This may be only a subset of the total nodes in the network, thereby making it impractical to reverse engineer the network (e.g., due to missing nodes and no connection information). This protection means that this system could accept third party implementation of the "answer system" without compromising confidential or proprietary information, or even important trade secret information, about the domain descriptions being processed by the IEs.

Each answer system can then be free to operate asynchronously, sending information on its own timetable. It may send an input package that optionally includes a hierarchical format. For instance, an example hierarchical JSON format is shown below:

The "expiry" denotes the number of seconds for which this answer is considered, by the external system, to be valid. In the example above, at the system level the expiry can be 10 seconds (for example indicating that this system refreshes at 10 second intervals), but the node that has been set is considered valid for a longer period, namely 25 seconds in this example. The unset node has an expiry with an even shorter period. There can be any combination of expiries and given the potentially large number of independent input sources there can be conflicts between information in some cases and only expired or no information provided in others. This can be solved using the prioritization of inputs.

The use of a behavior tree (BT) in constructing a relevant Bayesian network calculation allows for flexible deployment so that different alarms, indicators and sensors can be supported by the tactical compute application. Furthermore, the AI Planner can use goal-oriented planning to construct the behavior tree (BT) such that the BT is bespoke to the specific IIoT case, which may not be known in advance.

Prioritization of Inputs

FIG. 10 shows a simplified table representation of an example real-time prioritization scheme. In this example, state labels are shown but the actual form of inputs can be, for example, {'Yes':0.85, 'No':0.15}. In this particular case, the prioritization increases left-to-right, so P2 is higher priority than P1, P3 is higher priority than P2, etc. The expiry length is in seconds, but can be in microseconds, hours, or any other suitable time unit. In this table, 'None' represents the null or missing object, and is distinct from the possibility of the string "None" being the name of a possible state of an answer.

The input-stack on the blackboard can be processed at any time by the "network runner". The sources of input can be assigned a priority in the queue upon creation, and optionally provided full or limited write access to over-write their entry on the blackboard. The initial entry for any input source in this embodiment is to have the null-object, 'None', assigned to every possible input, with a date stamp (i.e., a time stamp) corresponding to the time of creation and an expiry length of zero. In the initial state, the entry from a failed or unresponsive source is optionally identified only by the fact that it has not posted any answers. In terms of sources (represented by the columns in FIG. 1) any set of posted answers where the date stamp+the expiry length is less than the current system time, is considered stale.

Looking into the details of processing the input-stack, the arrows in FIG. 10 show the application, left-to-right, following the priority that was assigned during the write package configuration stage.

```
{ "hash" : ...,
"name" : "...", "inputs" : [{
    "name": "...", "inputs" : [{ "name" : "example_node", "inputs" : ["off" : 0.0, "low" : 1.0,
"medium" : 0.0, "high" : 0.0], "expiry" : 25,
"name" : "second_example_node", "inputs" : None, "expiry" : 5 }]
    }],
"expiry" : 10
}
```

This very generic input form maps into the blackboard, with the "name" keys having values corresponding to the target networks and the "inputs" carrying the corresponding answers as the probabilities assigned to each state of each input node (or the null-object None). The example above shows a hierarchical input package, containing information on two input nodes where the first "example_node" is set but the second is not set.

In this example, there are various outcomes of interest, including:

1. Sources that provide information agree on the outcome and at least one of those sources has not expired. This state occurs for row 1 in FIG. 10.
2. Results with lower priority which have expired, have been over-written by higher priority results that are in-date (i.e., not stale). This state occurs for row 2 in FIG. 10, which results can be marked as superseded.

3. Results for which no inputs have been provided are inferred as outputs. For example, row 3 in FIG. 10 meets this criterion. This means that the system can flexibly evolve with previously inferred results later being made available by advances in data analytics. (See "Inference" as described herein).

4. Results with lower priority which have not expired can be over-written by higher priority results that are in-date. This state occurs for row 4 in FIG. 10, which can be marked as results that are in conflict. This row also demonstrates that questions are not limited to Yes/No, True/False, or other binary answer questions. In fact, the system can sometimes or always use a probability distribution input, so in the basic Yes/No case you would have [1,0] or [0,1], but [0.3,0.7] or [0.12,0.88] are also acceptable inputs.

5. Results with lower priority which have not expired can be over-written by higher priority results that have expired and can have multiple states such as ['low', 'moderate','high']. For example in row 5 of FIG. 10, a source that should poll every 15 seconds has stopped presenting information, but its information is more recent than the source with information that has not expired. This highlights some complexities that can occur, and the results can be marked as dubious.

6. All results are expired, as in row 6 of FIG. 10, which results are marked as stale.

With respect to prioritization, in some cases, probabilities from inputs are specifically not combined using Bayes Rule. The various sources of input can provide probability estimates for the same event, and are therefore not independent observations. Instead, a prioritized sequence is applied to capture the best information.

Notably, there is no sense in which this disclosure suggests that one data source (e.g., the real-time rig sensors) is fixed in a prioritization position for all its inputs. The various answer systems are prioritized, and each of these can take information from any (and multiple) data sources, so conversely the real-time rig sensors might contribute to many different answer systems. It can instead be the answer system that is responsible for posting to the input-stack blackboard and setting the appropriate expiry time. The timestamp is set upon receipt, so the blackboard acts as a universal clock for the real-time operation, and no time-alignment issue is produced. The blackboard will not need to maintain synchronicity with any of the external systems.

Inference

In some embodiments, an inference engine will apply for read input stack and write output stack access. Unlike a single input-stack that can extend across all answer systems, there can be a separate output storage space assigned to each IE.

By way of example, consider an example multi-layer configuration of causal Bayesian networks that constructs sensitivities between inputs and outputs. After polling and processing the current input-stack, inputs are applied to the causal Bayesian networks in a sequential and priority-based approach. To determine sensitivities, in this example, the inputs are expanded from a single column (such as in FIG. 10) to a matrix where each column after the first contains a perturbation of one input (such as in FIG. 11). This approach readily extends to manipulations that provide special treatment of any combination of nodes marked as superseded, conflict, dubious, etc.

FIG. 11 provides an example set of perturbations to inputs that allow network sensitivity to be computed by an IE. In this case, the probability values of the inputs are shown rather than the state labels. This also clarifies that 'None' as the null-object or missing answer is different from the state {"None": 1.0, "Many": 0.0}, which might be a valid input.

The subset of inputs to the first network, which are available from the input-stack, are applied. Following inference, the second network's inputs are first populated from the first network and then over-written (where available) from the input-stack. This process continues sequentially down the stack.

Of note, the output which gets posted will sometimes, or even usually, be a superset containing the inputs, and nodes that are not available to receive inputs may appear in the networks.

Non-Inference Uses

A third type of external system (such as a dashboard, alarm system, or an AI Planning system) can make use of either or both of the input-stack and the results of inference engines can apply for read input stacks and read output stacks. A simple implementation of a "system down" flag would apply for a read input stack and periodically inspect the input stack for expired inputs. That system could then flag the loss of that input to users (e.g., using a dashboard showing any of inputs as green for in-date, red for expired, or orange for inputs that will expire within a particular time window).

As a second example, a dashboard that has read output stacks access can show the results of the causal Bayesian networks described in the "Inference" section. An example is provided in FIG. 12, and shows the output nodes and sensitivity of the result to inputs (where those inputs impact the output).

Supplementary Questionnaire

A specialized answer system can request read input stack and write inputs. For such a system, it is possible to parse the input stack and then offer the user bespoke human override controls (e.g., questions relating to stale, conflicting or other input conditions). The frequency/expiry of inputs and how often the questions need to be asked can be changed based on the input condition (e.g., dubious results may merit more frequent updates) and sensitivity of the input.

Compound Systems as Behavior Trees

In the context of the present disclosure, the behavior tree architecture lends itself to supporting additional use cases. For example, it may be beneficial to have an answer system that implements "Answer on Demand" which would request or require an observer to have read output stacks access and an answerer having write inputs access.

Figure 13:
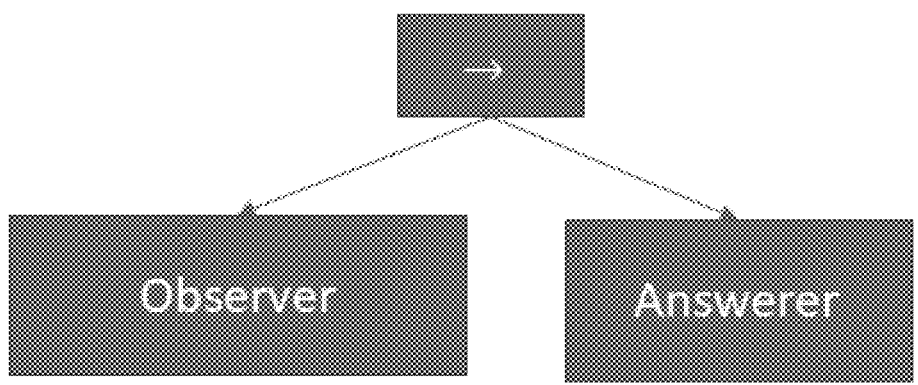
FIG. 13 is a behavior tree of an example 'Answer on Demand' process for use with embodiments of the present disclosure.

This can be implemented as a sequence, so that if the observer returns a success condition (e.g. a particular answer has expired) then the answerer is run. FIG. 13, for instance, shows an example implementation of an "Answer on Demand" process, in which the arrow in the first step implies "to here".

Figure 14:
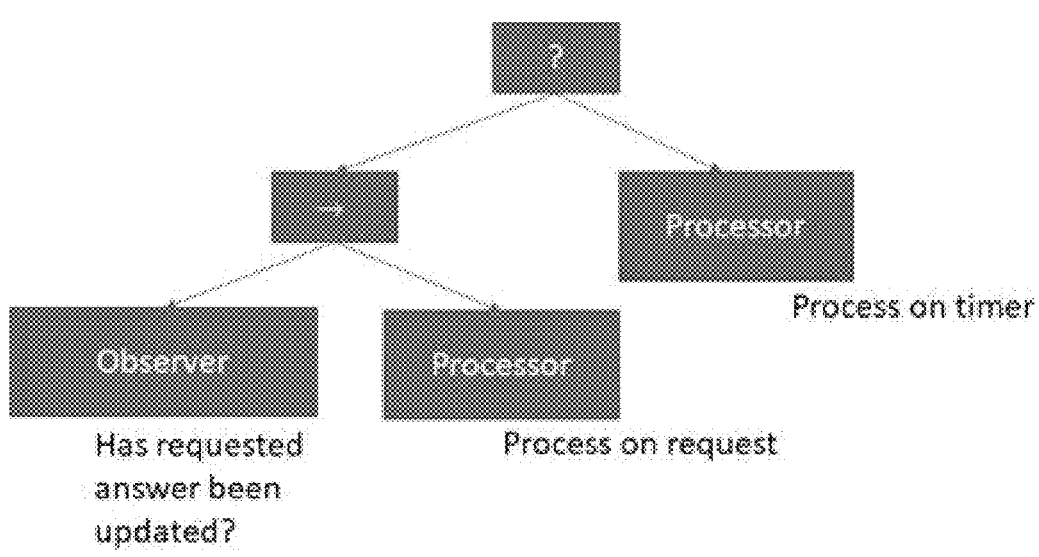
FIG. 14 is a behavior tree of an example 'Re-process on Updated Answer' process for use with embodiments of the present disclosure.

A "Re-process on updated answer" sequence can be similarly constructed. In an example embodiment, the causal Bayesian networks can be recalculated immediately when an answer changes, rather than on the next clock-tick of the inference engine. This can include an observer that is monitoring particular answers for change. If the observer returns "FAIL" or another indicator that there has been no change to key answers, the processor can execute the inference engine on the defined clock-tick (e.g., every few minutes). When the observer returns "SUCCESS" or other indicator of the detection of a change to at least one key answer, an extra update of processor is triggered. These sequences are illustrated in FIG. 14.

Figure 15:
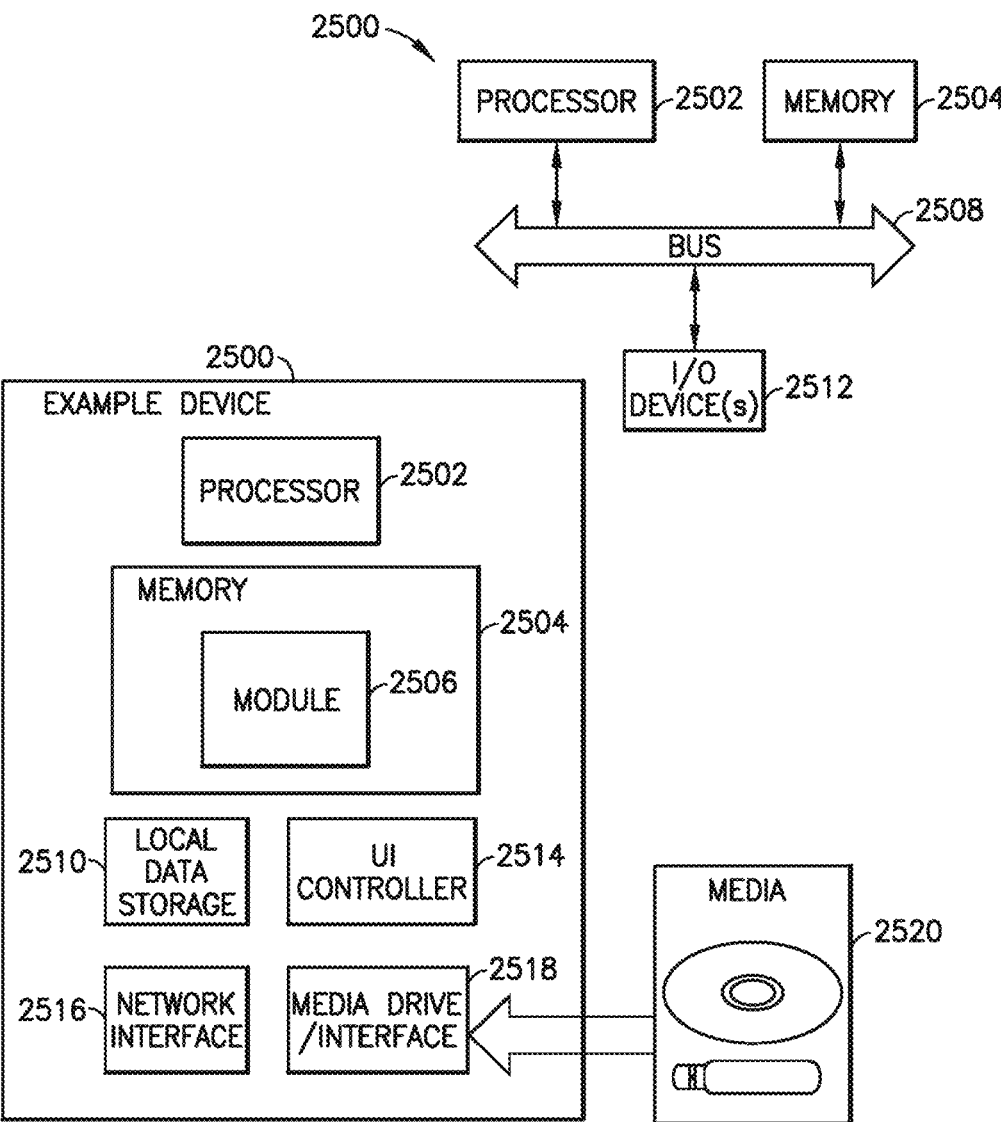
FIG. 15 is a functional block diagram of a computer processing system.

FIG. 15 illustrates an example device 2500, with a processor 2502 and memory 2504 that can be configured to implement various embodiments of the platform components (such as the gateway 11, cloud computing environment 17 and the remote management system 19)) and the methods and workflows as discussed in the present application. Memory 2504 can also host one or more databases and can include one or more forms of volatile data storage media such as random-access memory (RAM), and/or one or more forms of nonvolatile storage media (such as read-only memory (ROM), flash memory, and so forth).

Device 2500 is one example of a computing device or programmable device and is not intended to suggest any limitation as to scope of use or functionality of device 2500 and/or its possible architectures. For example, device 2500 can comprise one or more computing devices, programmable logic controllers (PLCs), etc.

Further, device 2500 should not be interpreted as having any dependency relating to one or a combination of components illustrated in device 2500. For example, device 2500 may include one or more computers, such as a laptop computer, a desktop computer, a mainframe computer, etc., or any combination or accumulation thereof.

Device 2500 can also include a bus 2508 configured to allow various components and devices, such as processors 2502, memory 2504, and local data storage 2510, among other components, to communicate with each other.

Bus 2508 can include one or more of any of several types of bus structures, including a memory bus or memory controller, a peripheral bus, an accelerated graphics port, and a processor or local bus using any of a variety of bus architectures. Bus 2508 can also include wired and/or wireless buses.

Local data storage 2510 can include fixed media (e.g., RAM, ROM, a fixed hard drive, etc.) as well as removable media (e.g., a flash memory drive, a removable hard drive, optical disks, magnetic disks, and so forth). One or more input/output (I/O) device(s) 2512 may also communicate via a user interface (UI) controller 2514, which may connect with I/O device(s) 2512 either directly or through bus 2508.

In one possible implementation, a network interface 2516 may communicate outside of device 2500 via a connected network. A media drive/interface 2518 can accept removable tangible media 2520, such as flash drives, optical disks, removable hard drives, software products, etc. In one possible implementation, logic, computing instructions, and/or software programs comprising elements of module 2506 may reside on removable media 2520 readable by media drive/interface 2518.

In one possible embodiment, input/output device(s) 2512 can allow a user (such as a human annotator) to enter commands and information to device 2500, and also allow information to be presented to the user and/or other components or devices. Examples of input device(s) 2512 include, for example, sensors, a keyboard, a cursor control device (e.g., a mouse), a microphone, a scanner, and any other input devices known in the art. Examples of output devices include a display device (e.g., a monitor or projector), speakers, a printer, a network card, and so on.

Various systems and processes of present disclosure may be described herein in the general context of software or program modules, or the techniques and modules may be implemented in pure computing hardware. Software generally includes routines, programs, objects, components, data structures, and so forth that perform particular tasks or implement particular abstract data types. An implementation of these modules and techniques may be stored on or transmitted across some form of tangible computer-readable media. Computer-readable media can be any available data storage medium or media that is tangible and can be accessed by a computing device. Computer readable media may thus comprise computer storage media. "Computer storage media" designates tangible media, and includes volatile and non-volatile, removable, and non-removable tangible media implemented for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information, and which can be accessed by a computer.

Some of the methods and processes described above can be performed by a processor. The term "processor" should not be construed to limit the embodiments disclosed herein to any particular device type or system. The processor may include a computer system. The computer system may also include a computer processor (e.g., a microprocessor, microcontroller, digital signal processor, general-purpose computer, special-purpose machine, virtual machine, software container, or appliance) for executing any of the methods and processes described above.

The computer system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

Some of the methods and processes described above can be implemented as computer program logic for use with the computer processor. The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Alternatively or additionally, the processor may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

The Industrial Internet of Things includes many practical applications at various industrial facilities, such as drilling rigs for onshore operations, which have multiple and differing requirements for event indicators, alerts and alarms which would benefit from access to the present invention.

FIG. 16 shows an example of a wellsite system 1600 (e.g., at a wellsite that may be onshore or offshore). As shown, the wellsite system 1600 can include a mud tank 1611 for holding mud and other material (e.g., where mud can be a drilling fluid), a suction line 1612 that serves as an inlet to a mud pump 1613 for pumping mud from the mud tank 1611 such that mud flows to a vibrating hose 1614, a drawworks 1615 for winching drill line or drill lines, a standpipe 1616 that receives mud from the vibrating hose 1614, a kelly hose 1617 that receives mud from the standpipe 1616, a gooseneck or goosenecks 1618, a traveling block 1619, a crown block 1620 for carrying the traveling block 1619 via the drill line or drill lines, a derrick 1621, a kelly 1622 or a top drive, a rotary table 1623, a drill floor 1624, a drill string 1625, a drill bit 1626, casing 1627, and a flow pipe_1628 that carries mud and other material to, for example, the mud tank 1611.

In the example system of FIG. 16, a borehole 1630 is formed in subsurface formations 1631 by rotary drilling; noting that various example embodiments may also use directional drilling to produce directional wellbore 1630-2 in lieu of a vertical wellbore 1630-1. As shown in the example of FIG. 16, the drill string 1625 is suspended within the borehole 1630 and has a bottomhole assembly (BHA) 1632 that includes the drill bit 1626 at its lower end.

The wellsite system 1600 can provide for operation of the drill string 1625 and other operations. As shown, the wellsite system 1600 includes the derrick 1621 positioned over the borehole 1630. As mentioned, the wellsite system 1600 can include the rotary table 1623 where the drill string 1625 pass through an opening in the rotary table 1623.

As shown in the example of FIG. 16, the wellsite system 1600 can include the kelly 1622 and associated components, etc., or a top drive and associated components. As to a kelly example, the kelly 1622 may be a square or hexagonal metal/alloy bar with a hole drilled therein that serves as a mud flow path. The kelly 1622 can be used to transmit rotary motion from the rotary table 1623 via a kelly drive bushing to the drill string 1625, while allowing the drill string 1625 to be lowered or raised during rotation. The kelly 1622 can pass through the kelly drive bushing, which can be driven by the rotary table 1623. As an example, the rotary table 1623 can include a master bushing that operatively couples to the kelly drive bushing such that rotation of the rotary table 1623 can turn the kelly drive bushing and hence the kelly 1622. The kelly drive bushing can include an inside profile matching an outside profile (e.g., square, hexagonal, etc.) of the kelly 1622; however, with slightly larger dimensions so that the kelly 1622 can freely move up and down inside the kelly drive bushing.

As to a top drive example, the top drive can provide functions performed by a kelly and a rotary table. The top drive can turn the drill string. As an example, the top drive can include one or more motors (e.g., electric and/or hydraulic) connected with appropriate gearing to a short section of pipe called a quill, that in turn may be screwed into a saver sub or the drill string 1625 itself. The top drive can be suspended from the traveling block 1619, so the rotary mechanism is free to travel up and down the derrick 1621. As an example, a top drive may allow for drilling to be performed with more joint stands than a kelly/rotary table approach.

In the example of FIG. 16, the mud tank 1611 can hold mud, which can be one or more types of drilling fluids. As an example, a wellbore may be drilled to produce fluid, inject fluid or both (e.g., hydrocarbons, minerals, water, etc.).

In the example of FIG. 16, the drill string 1625 (e.g., including one or more downhole tools) may be composed of a series of pipes threadably connected together to form a long tube with the drill bit 1626 at the lower end thereof. As the drill string 1625 is advanced into a wellbore for drilling, at some point in time prior to or coincident with drilling, the mud may be pumped by the pump 1613 from the mud tank 1611 (e.g., or other source) via the lines 1614, 1616, 1617 to a port of the kelly 1622 or, for example, to a port of the top drive. The mud can then flow via a passage (e.g., or passages) in the drill string 1625 and out of ports located on the drill bit 1626. As the mud exits the drill string 1625 via ports in the drill bit 1625, the mud can then circulate upwardly through an annular region between an outer surface(s) of the drill string 1626 and surrounding wall(s) (e.g., open borehole, casing, etc.), as indicated by directional arrows. In such a manner, the mud lubricates the drill bit 1626 and carries heat energy (e.g., frictional or other energy) and formation cuttings to the surface where the mud (e.g., and cuttings) may be returned to the mud tank 1611, for example, for recirculation (e.g., with processing to remove cuttings, etc.).

The mud pumped by the pump 1613 into the drill string 1625 may, after exiting the drill string 1625, form a mudcake that lines the wellbore which, among other functions, may reduce friction between the drill string 1625 and surrounding wall(s) (e.g., borehole, casing, etc.). A reduction in friction may facilitate advancing or retracting the drill string 1625. During a drilling operation, the entire drill string 1625 may be pulled from a wellbore 1630 and optionally replaced, for example, with a new or sharpened drill bit, a smaller diameter drill string, etc. As mentioned, the act of pulling a drill string out of a hole or replacing it in a hole is referred to as tripping. A trip may be referred to as an upward trip or an outward trip or as a downward trip or an inward trip depending on trip direction.

As an example, consider a downward trip where upon arrival of the drill bit 1626 of the drill string 1625 at the bottom of a wellbore 1630, pumping of the mud commences to lubricate the drill bit 1626 for purposes of drilling to enlarge the wellbore. As mentioned, the mud can be pumped by the pump 1613 into a passage of the drill string 1625 and, upon filling of the passage, the mud may be used as a transmission medium to transmit energy, for example, energy that may encode information as in mud-pulse telemetry.

As an example, mud-pulse telemetry equipment may include a downhole device configured to effect changes in pressure in the mud to create an acoustic wave or waves upon which information may be modulated. In such an example, information from downhole equipment (e.g., one or more modules of the drill string 1625) may be transmitted uphole to an uphole device, which may relay such information to other equipment for processing, control, etc.

As an example, telemetry equipment may operate via transmission of energy via the drill string 1625 itself. For example, consider a signal generator that imparts coded energy signals to the drill string 1625 and repeaters that may receive such energy and repeat it to further transmit the coded energy signals (e.g., information, etc.).

In some embodiments, the drill string 1625 may be fitted with telemetry equipment that includes a rotatable drive shaft, a turbine impeller mechanically coupled to the drive shaft such that the mud can cause the turbine impeller to rotate, a modulator rotor mechanically coupled to the drive shaft such that rotation of the turbine impeller causes said modulator rotor to rotate, a modulator stator mounted adjacent to or proximate to the modulator rotor such that rotation of the modulator rotor relative to the modulator stator creates pressure pulses in the mud, and a controllable brake for selectively braking rotation of the modulator rotor to modulate pressure pulses. In such example, an alternator may be coupled to the aforementioned drive shaft where the alternator includes at least one stator winding electrically coupled to a control circuit to selectively short the at least one stator winding to electromagnetically brake the alternator and thereby selectively brake rotation of the modulator rotor to modulate the pressure pulses in the mud.

In the example of FIG. 16, an uphole control and/or data acquisition system 1633 may include circuitry to sense pressure pulses generated by telemetry equipment and, for example, communicate sensed pressure pulses or information derived therefrom for process, control, etc. The BHA 1632 of the illustrated example can include a logging-while-drilling (LWD) module 1634, a measuring-while-drilling (MWD) module 1635, directional drilling modules 1636 (e.g., a directional motor, a rotary steerable tool, etc.), the drill bit 1626, and other suitable tools and collars. Such components or modules may be referred to as tools where a drill string 1625 can include a plurality of tools.

An LWD module 1634 may be housed in a suitable type of drill collar and can contain one or a plurality of selected types of logging tools. It will also be understood that more than one LWD 1634 and/or MWD 1635 module can be employed in the BHA 1632. An LWD module 1634 can include capabilities for measuring, processing, and storing information related to the subsurface formation 1631 and the wellbore 1630, as well as for communicating with the surface equipment. For instance, an LWD module 1634 may include a seismic measuring device.

An MWD module 1635 may be housed in a suitable type of drill collar and can contain one or more devices for measuring characteristics of the drill string 1625 and the drill bit 1626. As an example, an MWD tool 1635 may include equipment for generating electrical power, for example, to power various components of the drill string 1625. As an example, an MWD tool 1635 may include telemetry equipment, for example, where a turbine impeller can generate power by flow of the mud; it being understood that other power and/or battery systems may be employed for purposes of powering various components. As an example, an MWD module 1635 may include one or more of the following types of measuring devices: a weight-on-bit measuring device; a torque measuring device; a vibration measuring device; a shock measuring device; a stick-slip measuring device; a direction measuring device; or an inclination measuring device.

A drilling operation can include directional drilling where, for example, at least a portion of a well 1630-2 includes a curved axis. For example, consider a radius that defines curvature where an inclination with regard to the vertical may vary until reaching an angle between about 30 degrees and about 60 degrees or, for example, an angle to about 90 degrees or possibly greater than about 90 degrees.

A directional well can include several shapes where each of the shapes may aim to meet particular operational demands. As an example, a drilling process may be performed on the basis of information as and when it is relayed to a drilling engineer. As an example, inclination and/or direction may be modified based on information received during a drilling process. Deviation of a bore may be accomplished in part by use of a steering tool 1636 including downhole motor and/or a turbine. As to a motor, for example, a drill string can include a positive displacement motor (PDM).

As an example, a steering tool or system 1636 may be a steerable system and include equipment to perform a method such as geosteering. As an example, a steerable system can include a PDM or a turbine on a lower part of a drill string which, just above a drill bit, a bent sub can be mounted. As an example, above a PDM, MWD equipment that provides real time or near real time data of interest (e.g., inclination, direction, pressure, temperature, real weight on the drill bit, torque stress, etc.) and/or LWD equipment may be installed. As to the latter, LWD equipment can make it possible to send to the surface various types of data of interest, including for example, geological data (e.g., gamma ray log, resistivity, density and sonic logs, etc.).

The coupling of sensors providing information on the course of a well trajectory, in real time or near real time, with, for example, one or more logs characterizing the formations from a geological viewpoint, can allow for implementing a geosteering method. Such a method can include navigating a subsurface environment, for example, to follow a desired route to reach a desired target or targets.

A drill string can include an azimuthal density neutron (ADN) tool for measuring density and porosity; a MWD tool for measuring inclination (INCL), azimuth (AZI) and shocks; a compensated dual resistivity (CDR) tool for measuring resistivity and gamma ray related phenomena; one or more variable gauge stabilizers; one or more bend joints; and a geosteering tool, which may include a motor and optionally equipment for measuring and/or responding to one or more of inclination, resistivity and gamma ray related phenomena. Some or all of the foregoing may be integrated into the same tool. For instance, an LWD, MWD, or steering tool may include an inclination or azimuth measuring tool, a gamma ray or resistivity tool, and the like.

Geosteering can include intentional directional control of a wellbore based on results of downhole geological logging measurements in a manner that aims to keep a directional wellbore within a desired region, zone (e.g., a pay zone), etc. As an example, geosteering may include directing a wellbore to keep the wellbore in a particular section of a reservoir, for example, to minimize gas and/or water breakthrough and, for example, to maximize economic production from a well that includes the wellbore.

Referring again to FIG. 16, the wellsite system 1600 can include one or more sensors 1637 that are optionally operatively coupled to the control and/or data acquisition system 1633. As an example, a sensor or sensors may be at surface locations. As an example, a sensor or sensors may be at downhole locations. As an example, a sensor or sensors may be at one or more remote locations that are not within a distance of the order of about one hundred meters from the derrick 1621. As an example, a sensor or sensor may be at an offset wellsite where the wellsite system 1600 and the offset wellsite are in a common field (e.g., oil and/or gas field).

One or more of the sensors 1637 can be provided for tracking pipe, tracking movement of at least a portion of a drill string, etc. As another example, the system 1600 can include one or more sensors 1637 that can sense and/or transmit signals to a fluid conduit such as a drilling fluid conduit (e.g., a drilling mud conduit). For example, in the system 1600, the one or more sensors 1637 can be operatively coupled to portions of the standpipe 1616 through which mud flows. As an example, a downhole tool can generate pulses that can travel through the mud and be sensed by one or more of the one or more sensors 1637. In such an example, the downhole tool can include associated circuitry such as, for example, encoding circuitry that can encode signals, for example, to reduce demands as to transmission. As an example, circuitry at the surface may include decoding circuitry to decode encoded information transmitted at least in part via mud-pulse telemetry. As an example, circuitry at the surface may include encoder circuitry and/or decoder circuitry and circuitry downhole may include encoder circuitry and/or decoder circuitry. As an example, the system 1600 can include a transmitter that can generate signals that can be transmitted downhole via mud (e.g., drilling fluid) as a transmission medium.

In some embodiments, data from the sensors 1637 or from the control/data acquisition module 1633 can be used in embodiments of the present disclosure. For instance, data from such systems and modules may be used as real-time data for input into a system executing a Behavior Tree and Causal Network as described herein for operational surveillance of the drilling system 1600.

In other embodiments, data from the sensors at a wellsite that produces oil or other hydrocarbons extracted from a hydrocarbon reservoir (or fluid that contains heat extraction from a geothermal reservoir) can be used in embodiments of the present disclosure. For instance, data from such sensors may be used as real-time data for input into a system executing a Behavior Tree and Causal Network as described herein for operational surveillance of the production system at the wellsite.

Although some embodiments of the present disclosure have been described with respect to a drilling system, other implementations are considered in other downhole environments, or in environments outside a downhole or energy production environment. For instance, embodiments of the present disclosure may be used in the placement of pipelines and utility lines, or in general manufacturing environments.

One or more specific embodiments of the present disclosure are described herein; however, these described embodiments are examples of the presently disclosed techniques. Additionally, in an effort to provide a concise description of these embodiments, not all features of an actual embodiment are described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that is within standard manufacturing or process tolerances, or which still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A system for monitoring operations of an industrial facility, the system comprising:

a gateway device disposed at the industrial facility and operably coupled to sensors disposed at the industrial facility, wherein the gateway device executes tasks configured to;

i) monitor alarms or triggers or other events related to operating conditions of the industrial facility;

ii) identify a particular alarm or trigger or other event that is activated or set;

iii) identify at least one risk associated with the particular alarm or trigger or other event that is activated or set;

iv) dynamically construct a causal network to evaluate the at least one risk;

v) evaluate the causal network and generate a list of questions to evaluate the at least one risk;

vi) generate or receive a list of actions or indicators corresponding to the questions that can be computed by scarce computational resources of the gateway device based on automated analysis of sensor data generated from the sensors disposed at the industrial facility;

vii) compute the actions or indicators based on the automated analysis of the sensor data by the scarce computational resources of the gateway device;

viii) use the actions or indicators as input to the causal network to evaluate the at least one risk;

ix) communicate a questionnaire to at least one human expert to obtain additional actions or indicators corresponding to the questions, wherein the additional actions or indicators are provided by the at least one human expert without the gateway device analyzing the sensor data generated from the sensors disposed at the industrial facility; and x) use the additional actions or indicators as input to the causal network to evaluate the at least one risk.

2. The system of claim 1, wherein:

the tasks are further configured to build and output a digital report that characterizes the at least one risk based on output data generated by the causal network.

3. The system of claim 1, wherein:

the tasks are implemented by a behavior tree.

4. The system of claim 1, wherein:

the causal network comprises a causal Bayesian network or a causal Bayesian network stack.

5. The system of claim 1, wherein:

the construction of the causal network involves querying and processing a domain-specific knowledge graph.

6. The system of claim 5, wherein:

the processing of the domain-specific knowledge graph extracts a sub-network from a much larger causal network using do-calculus.

7. The system of claim 1, wherein:

the list of actions or indicators is determined by an AI planner module that balances value of information that each action or indicator brings to a specific question, and a compute cost and/or time it takes to process each action or indicator.

8. The system of claim 7, wherein:

the AI planner module is configured to create a plan that identifies the list of actions or indicators that are to be computed and input to the causal network for evaluating the at least one risk.

9. The system of claim 7, further comprising:

a cloud-computing system or other computing resource disposed remotely from the industrial facility and operably coupled to the gateway device, wherein the cloud-computing system or other computing resource implements some or all of the functionality of the AI planner module.

10. A method for monitoring operations of an industrial facility, the method comprising:

providing a gateway device disposed at the industrial facility and operably coupled to sensors disposed at the industrial facility, wherein the gateway device is configured to execute tasks that:

i) monitor alarms or triggers or other events related to operating conditions of the industrial facility;

ii) identify a particular alarm or trigger or other event that is activated or set;

iii) identify at least one risk associated with the particular alarm or trigger or other event that is activated or set; and iv) dynamically construct a causal network to evaluate the at least one risk, wherein:

the construction of the causal network involves querying and processing a domain-specific knowledge graph; and the processing the domain-specific knowledge graph extracts a sub-network from a much larger causal network using do-calculus.

11. The method of claim 10, wherein:

the gateway device is further configured to execute tasks that v) evaluate the causal network and generate a list of questions to evaluate the at least one risk.

12. The method of claim 11, wherein:

the gateway device is further configured to execute tasks that:

vi) generate or receive a list of actions or indicators corresponding to the questions that can be computed by scarce computational resources of the gateway device based on automated analysis of sensor data generated from the sensors disposed at the industrial facility;

vii) compute the actions or indicators based on automated analysis of sensor data by the scarce computational resources of the gateway device; and viii) use the actions or indicators as input to the causal network to evaluate the at least one risk.

13. The method of claim 12, wherein:

the gateway device is further configured to execute tasks that:

ix) communicate a questionnaire to at least one human expert to obtain additional actions or indicators corresponding to the questions, wherein the additional actions or indicators are provided by the at least one human expert without the gateway device analyzing sensor data generated from the sensors disposed at the industrial facility; and x) use the additional actions or indicators as input to the causal network to evaluate the at least one risk.

14. The method of claim 10, wherein:

the gateway device is further configured to execute tasks that build and output a digital report that characterizes the at least one risk based on output data generated by the causal network.

15. The method of claim 10, wherein:

the tasks executed by the gateway device are implemented by a behavior tree.

16. The method of claim 10, wherein:

the causal network comprises a causal Bayesian network or a causal Bayesian network stack.

17. The method of claim 12, further comprising:

configuring an AI planner module to generate the list of actions or indicators that can be computed by the scarce computational resources of the gateway device based on the automated analysis of the sensor data, wherein the AI planner module balances value of information that each action or indicator brings to a specific question, and a compute cost and/or time it takes to process each action or indicator.

18. The method of claim 17, wherein:

the AI planner module is configured to create a plan that identifies the list of actions or indicators that are to be computed and input to the causal network for evaluating the at least one risk.

19. The method of claim 17, further comprising:

providing a cloud-computing system or other computing resource disposed remotely from the industrial facility and operably coupled to the gateway device, wherein the cloud computing system or other computing resource implement some or all of the functionality of the AI planner module.

20. A method for monitoring operations of an industrial facility, the method comprising:

providing a gateway device disposed at the industrial facility and operably coupled to sensors disposed at the industrial facility, wherein the gateway device is configured to execute tasks that:

i) monitor alarms or triggers or other events related to operating conditions of the industrial facility;

ii) identify a particular alarm or trigger or other event that is activated or set;

iii) identify at least one risk associated with the particular alarm or trigger or other event that is activated or set;

iv) dynamically construct a causal network to evaluate the at least one risk;

v) evaluate the causal network and generate a list of questions to evaluate the at least one risk;

vi) generate or receive a list of actions or indicators corresponding to the questions that can be computed by scarce computational resources of the gateway device based on automated analysis of sensor data generated from the sensors disposed at the industrial facility;

vii) compute the actions or indicators based on automated analysis of sensor data by the scarce computational resources of the gateway device;

viii) use the actions or indicators as input to the causal network to evaluate the at least one risk;

ix) communicate a questionnaire to at least one human expert to obtain additional actions or indicators corresponding to the questions, wherein the additional actions or indicators are provided by the at least one human expert without the gateway device analyzing sensor data generated from the sensors disposed at the industrial facility; and x) use the additional actions or indicators as input to the causal network to evaluate the at least one risk.

21. The method of claim 20, wherein:

the gateway device is further configured to execute tasks that build and output a digital report that characterizes the at least one risk based on output data generated by the causal network.

22. The method of claim 20, wherein:

the tasks executed by the gateway device are implemented by a behavior tree.

23. The method of claim 20, wherein:

the causal network comprises a causal Bayesian network or a causal Bayesian network stack.

24. The method of claim 20, further comprising:

configuring an AI planner module to generate the list of actions or indicators that can be computed by the scarce computational resources of the gateway device based on the automated analysis of the sensor data, wherein the AI planner module balances value of information that each action or indicator brings to a specific question, and a compute cost and/or time it takes to process each action or indicator.

\* \* \* \* \*